(12) United States Patent
Liu

(10) Patent No.: US 12,070,917 B2
(45) Date of Patent: Aug. 27, 2024

(54) MANUFACTURING PROCESS TOOL AND MANUFACTURING PROCESS METHOD FOR LATERAL POSITIONING STRIP TOOTHED BELT

(71) Applicant: Suhua Liu, Shandong (CN)

(72) Inventor: Suhua Liu, Shandong (CN)

(73) Assignee: Suhua Liu, Shandong (CN)

( * ) Notice: Subject to any disclaimer, the term of this patent is extended or adjusted under 35 U.S.C. 154(b) by 272 days.

(21) Appl. No.: 17/626,130

(22) PCT Filed: Jul. 20, 2020

(86) PCT No.: PCT/CN2020/103127
§ 371 (c)(1),
(2) Date: Jan. 11, 2022

(87) PCT Pub. No.: WO2021/008626
PCT Pub. Date: Jan. 21, 2021

(65) Prior Publication Data
US 2022/0274360 A1    Sep. 1, 2022

(30) Foreign Application Priority Data
Jul. 18, 2019    (CN) .......................... 201910651617.2

(51) Int. Cl.
*B29D 29/08*    (2006.01)
*B29C 33/12*    (2006.01)

(52) U.S. Cl.
CPC .............. *B29D 29/08* (2013.01); *B29C 33/12* (2013.01)

(58) Field of Classification Search
CPC ..... B29D 29/08; B29C 33/12; B29L 2029/00; B65G 17/08; B65G 17/38; B65G 2207/30
See application file for complete search history.

(56) References Cited

U.S. PATENT DOCUMENTS

| | | | |
|---|---|---|---|
| 2008/0047656 A1* | 2/2008 | Fickenwirth ........... | B29D 29/08 156/140 |
| 2014/0062396 A1 | 3/2014 | Reddy | |
| 2015/0133250 A1* | 5/2015 | Wu .......................... | F16G 1/10 474/261 |

FOREIGN PATENT DOCUMENTS

| | | |
|---|---|---|
| CN | 101434128 A | 5/2009 |
| CN | 108910409 A | 11/2018 |

(Continued)

OTHER PUBLICATIONS

First Examination Report of corresponding IN application No. 202217006711.

(Continued)

*Primary Examiner* — Gene O Crawford
*Assistant Examiner* — Abby A Jorgensen
(74) *Attorney, Agent, or Firm* — Samson G. Yu

(57) ABSTRACT

Disclosed is a manufacturing process tool for a lateral positioning strip toothed belt, including a lateral positioning strip, a fixing molded plate, a lateral strip belt width positioner, a lateral strip belt length positioner and a rubber body. The fixing molded plate fixes the lateral strip belt width positioner and/or the lateral strip belt length positioner, the lateral strip belt length positioner is provided on one side or two sides of the fixing molded plate, the lateral strip belt length positioner faces an inner side of the fixing molded plate and forms a lateral positioning strip belt forming groove together with the lateral strip belt width positioner, an intra-belt lateral positioning strip is provided in the lateral positioning strip belt forming groove, the rubber body is provided in the lateral positioning strip belt forming groove.

13 Claims, 11 Drawing Sheets

(56) References Cited

FOREIGN PATENT DOCUMENTS

| CN | 208916058 U | * | 5/2019 | | |
|---|---|---|---|---|---|
| CN | 208916058 U | | 5/2019 | | |
| CN | 210001030 U | * | 1/2020 | | |
| JP | 2001293792 A | * | 10/2001 | | |
| JP | 2001293792 A | | 10/2001 | | |
| JP | 2002283289 A | * | 10/2020 | | |
| WO | WO-2018206008 A1 | * | 11/2018 | ............. | B65D 88/54 |
| WO | WO-2021008626 A1 | * | 1/2021 | ............. | B29C 33/12 |

OTHER PUBLICATIONS

International Search Report for corresponding application PCT/CN2020/103127 filed Jul. 20, 2020; Mail date Oct. 22, 2020.

* cited by examiner

MANUFACTURING PROCESS TOOL AND MANUFACTURING PROCESS METHOD FOR LATERAL POSITIONING STRIP TOOTHED BELT

TECHNICAL FIELD

The disclosure belongs to the field of machinery, and particularly relates to a manufacturing process tool and a manufacturing process method for a lateral positioning strip toothed belt.

BACKGROUND

The conveying belt of an old-fashioned belt feeder or an armor belt feeder is driven by a driving roller and a driven roller for feeding by virtue of friction force. Due to frequent stretch of the belt and the armor belt, the positions of the driving roller and the driven roller need to be adjusted to match the tensioning of the belt and the armor belt for continuous work. On-site workers pull the rollers at the two ends of the belt or the armor belt too far, causing serious shutdown accidents due to breakage of the belt or the armor belt, and also causing shutdown faults such as electric motor burnout when the electric motor starts the belt or the armor belt to rotate due to electric motor power overload resulting from frequent overlarge tension force. Attached to the rollers, the belt or the armor belt rotates and works by means of the friction force. Further, two roller shafts are inevitably unparallel and the shaft ends of the two roller shafts form a parallelogram when the driving roller and the driven roller are mounted. In addition, under the influences of the belt edge free of ribs, gaps between the armor belt penetrating strips and the through holes, gaps between the plurality of armor sheets, tensile force, temperature, a carrier roller, roller deflection, etc., the belt or the armor belt deforms and often deviates in the running process, resulting in material spilling and leaking, abrasion to a guide chute, and deviation tearing and breakage of the belt or the armor belt. Thus, serious manpower and material resource waste is caused by frequent maintenance and replacement on the use site, the production efficiency shrinks, and the environment is polluted. In order to solve the problems, the inventor invents a lateral positioning strip toothed belt achieving conveyance by gear shifting teeth. As racks are uniformly provided on two sides of the rubber belt of the lateral positioning strip toothed belt, the lateral positioning strip toothed belt cannot be manufactured by an old rubber belt manufacturing process. Accordingly, in order to solve the problem about production and manufacturing of the lateral positioning strip toothed belt, the preset invention provides a manufacturing process tool and a manufacturing process method for a lateral positioning strip toothed belt.

SUMMARY

The disclosure is achieved by using the following solution:
  providing an upper fixed lateral positioning strip device and a lower fixed lateral positioning strip device to form a lateral strip belt length positioner, the lateral strip belt length positioner and a fixing molded plate being connected in a separated manner or integrated, and the upper fixed lateral positioning strip device and the lower fixed lateral positioning strip device being connected in a separated manner or integrated;
  providing a front lateral strip belt width positioner and/or a rear lateral strip belt width positioner to form a lateral strip belt width positioner, the lateral strip belt width positioner and the fixing molded plate being connected in a separated manner or integrated;
  providing a lateral strip fixing hole or a lateral strip fixing groove in the lateral strip belt length positioner;
  providing the fixing molded plate, the fixing molded plate being configured to fix the lateral strip belt width positioner and/or the lateral strip belt length positioner;
  providing an extra-belt lateral positioning strip and an intra-belt lateral positioning strip to form a lateral positioning strip;
  providing the lateral strip belt length positioner on one side or two sides of the fixing molded plate, the lateral strip belt length positioner facing an inner side of the fixing molded plate to form a lateral positioning strip belt forming groove together with the lateral strip belt width positioner;
  providing, when the upper fixed lateral positioning strip device and the lower fixed lateral positioning strip device separated from each other are used, fixed lateral positioning strip grooves in the upper fixed lateral positioning strip device and/or the lower fixed lateral positioning strip device, providing the extra-belt lateral positioning strip in the fixed lateral positioning strip groove, providing the intra-belt lateral positioning strip in the lateral positioning strip belt forming groove, buckling the upper fixed lateral positioning strip device and the lower fixed lateral positioning strip device, providing the front lateral strip belt width positioner and/or the rear lateral strip belt width positioner at an end of the fixing molded plate, so as to buckle the lateral strip belt width positioner, the lateral strip belt length positioner and the fixing molded plate to form the lateral positioning strip belt forming groove, providing the intra-belt lateral positioning strip in the lateral positioning strip belt forming groove, and providing a rubber body in the lateral positioning strip belt forming groove, the rubber body being wrapped around the intra-belt lateral positioning strip to form a lateral positioning strip toothed belt;
  drawing the intra-belt lateral positioning strip out to form a perforated lateral positioning strip belt or integrating the intra-belt lateral positioning strip and the rubber body, the extra-belt lateral positioning strip forming a lateral positioning strip toothed belt on one side or two sides of the lateral positioning strip belt; and
  combining, when the upper fixed lateral positioning strip device and the lower fixed lateral positioning strip device are integrated, the upper fixed lateral positioning strip device and the lower fixed lateral positioning strip device to form a hole type fixed lateral positioning strip device, providing a fixed extra-belt lateral strip hole in a side portion of the hole type fixed lateral positioning strip device, providing the extra-belt lateral positioning strip in the fixed extra-belt lateral strip hole, the hole type fixed lateral positioning strip device facing an inner side of the fixing molded plate to form a lateral positioning strip belt forming groove together with the lateral strip belt width positioner, providing the intra-belt lateral positioning strip in the lateral positioning strip belt forming groove, providing the rubber body in the lateral positioning strip belt forming groove, the rubber body being wrapped around the intra-belt lateral positioning strip to form the lateral positioning strip toothed belt, and drawing the intra-belt lateral positioning strip out to form the perforated lateral positioning strip belt or integrating the intra-belt lateral positioning strip and the rubber body.

When the upper fixed lateral positioning strip device and the lower fixed lateral positioning strip device are integrated, a fixed extra-belt lateral positioning strip through hole is provided in the lateral strip belt length positioner or a fixed extra-belt lateral positioning strip groove is formed in the lateral strip belt length positioner so as to form a groove type fixed lateral positioning strip device, the extra-belt lateral positioning strip is provided in the fixed extra-belt lateral positioning strip groove, the groove type fixed lateral positioning strip device faces the inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body being wrapped around the intra-belt lateral positioning strip to form the lateral positioning strip toothed belt, and the intra-belt lateral positioning strip is drawn out to form the perforated lateral positioning strip belt or the intra-belt lateral positioning strip and the rubber body are integrated.

When the upper fixed lateral positioning strip device and the lower fixed lateral positioning strip device separated from each other are used, the lower fixed lateral positioning strip device is set to be a groove type lower fixed lateral positioning strip device, the groove type lower fixed lateral positioning strip device is provided on the fixing molded plate, the upper fixed lateral positioning strip device is set to be an upper fixed lateral positioning strip block matching the groove type lower fixed lateral positioning strip device, the groove type lower fixed lateral positioning strip device is provided with a plurality of equidistant fixed lateral positioning strip grooves, the plurality of upper fixed lateral positioning strip blocks match the plurality of equidistant fixed lateral positioning strip grooves to form a plurality of equidistant fixed lateral positioning strip holes, the extra-belt lateral positioning strip is provided in the plurality of equidistant fixed lateral positioning strip holes, the intra-belt lateral positioning strip is provided in the lateral positioning strip belt forming groove, the front lateral strip belt width positioner and/or the rear lateral strip belt width positioner is provided at the end of the fixing molded plate, the rubber body is provided in the lateral positioning strip belt forming groove, and the rubber body is wrapped around the intra-belt lateral positioning strip to form the lateral positioning strip toothed belt.

A manufacturing process tool for lateral positioning strip toothed belt includes a lateral positioning strip, a fixing molded plate, a lateral strip belt width positioner, a lateral strip belt length positioner and a rubber body, where the lateral strip belt length positioner and the fixing molded plate are connected in a separated mode or integrated, the lateral strip belt width positioner and the fixing molded plate are connected in a separated mode or integrated, the lateral strip belt length positioner includes a left lateral strip belt length positioner and/or a right lateral strip belt length positioner, the fixing molded plate is configured to fix the lateral strip belt width positioner and/or the lateral strip belt length positioner, the lateral strip belt length positioner is provided on one side or two sides of the fixing molded plate, the lateral strip belt length positioner faces the inner side of the fixing molded plate to form the lateral positioning strip belt forming groove together with the lateral strip belt width positioner, and the lateral strip belt length positioner includes an upper fixed lateral positioning strip device and a lower fixed lateral positioning strip device, the upper fixed lateral positioning strip device and the lower fixed lateral positioning strip device being connected in a separated mode or integrated; when the upper fixed lateral positioning strip device and the lower fixed lateral positioning strip device are connected in the separated mode, the upper fixed lateral positioning strip device and/or the lower fixed lateral positioning strip device is provided with the fixed lateral positioning strip groove, the lateral positioning strip includes an extra-belt lateral positioning strip and an intra-belt lateral positioning strip, the extra-belt lateral positioning strip being provided in the fixed lateral positioning strip groove, and the intra-belt lateral positioning strip being provided in the lateral positioning strip belt forming groove, the upper fixed lateral positioning strip device and the lower fixed lateral positioning strip device are buckled, the lateral strip belt width positioner includes a front lateral strip belt width positioner and/or a rear lateral strip belt width positioner, the front lateral strip belt width positioner and/or the rear lateral strip belt width positioner is provided at an end of the fixing molded plate, the lateral strip belt width positioner, the lateral strip belt length positioner and the fixing molded plate are buckled to form a lateral positioning strip belt forming groove, the intra-belt lateral positioning strip is provided in the lateral positioning strip belt forming groove, the rubber body is provided in the lateral positioning strip belt forming groove, the rubber body is wrapped around the intra-belt lateral positioning strip to form a lateral positioning strip toothed belt, the intra-belt lateral positioning strip is drawn out to form a perforated lateral positioning strip belt or the intra-belt lateral positioning strip and the rubber body are integrated, and the extra-belt lateral positioning strip forms a lateral positioning strip toothed belt on one side or two sides of the lateral positioning strip belt; when the upper fixed lateral positioning strip device and the lower fixed lateral positioning strip device are integrated, the upper fixed lateral positioning strip device and the lower fixed lateral positioning strip device are combined to form a hole type fixed lateral positioning strip device, a fixed extra-belt lateral strip hole is provided in a side portion of the hole type fixed lateral positioning strip device, the extra-belt lateral positioning strip is provided in the fixed extra-belt lateral strip hole, the hole type fixed lateral positioning strip device faces an inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body is wrapped around the intra-belt lateral positioning strip to form the lateral positioning strip toothed belt, and the intra-belt lateral positioning strip is drawn out to form the perforated lateral positioning strip belt or the intra-belt lateral positioning strip and the rubber body are integrated; when the upper fixed lateral positioning strip device and the lower fixed lateral positioning strip device are integrated, a fixed extra-belt lateral positioning strip through hole is provided in the lateral strip belt length positioner or a fixed extra-belt lateral positioning strip groove is formed in the lateral strip belt length positioner so as to form a groove type fixed lateral positioning strip device, the extra-belt lateral positioning strip is provided in the fixed extra-belt lateral positioning strip groove, the groove type fixed lateral positioning strip device faces the inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body being wrapped around the intra-belt lateral positioning strip to form the lateral positioning strip toothed belt, and the intra-belt lateral positioning strip is drawn out to form the perforated lateral positioning strip belt or the intra-belt lateral positioning strip and the rubber body are integrated; and when the upper fixed lateral positioning strip device and the lower fixed lateral positioning strip device separated from each other are used, the lower fixed lateral positioning strip device includes a groove type lower fixed lateral positioning strip device, the groove type lower fixed lateral positioning strip device is provided on the fixing molded plate, the upper fixed lateral positioning strip device includes an upper fixed lateral positioning strip block, the groove type lower fixed lateral positioning strip device is provided with a plurality of equidistant fixed lateral positioning strip grooves, the plurality of upper fixed lateral positioning strip blocks match the plurality of equidistant fixed lateral positioning strip grooves to form a plurality of equidistant fixed lateral positioning strip holes, the extra-belt lateral positioning strip is provided in the plurality of equidistant fixed lateral positioning strip holes, the intra-belt lateral positioning strip is provided in the lateral positioning strip belt forming groove, the front lateral strip belt width positioner and/or the rear lateral strip belt width positioner is provided at the end of the fixing molded plate, the rubber body is provided in the lateral positioning strip belt forming groove, and the rubber body is wrapped around the intra-belt lateral positioning strip to form the lateral positioning strip toothed belt.

The fixing molded plate includes one or more of a molded plate positioning strip groove, a molded plate positioning strip hole, a molded plate positioning strip flange, and a molded plate positioning strip flat plate and a molded plate positioning strip clamping member, the molded plate positioning strip groove or the molded plate positioning strip hole or the molded plate positioning strip flange or the molded plate positioning strip flat plate or the molded plate positioning strip clamping member being configured to position the lateral strip belt length positioner.

The fixing molded plate includes an upper fixing molded plate and a lower fixing molded plate, the lower fixing molded plate being configured to position the lateral strip belt length positioner and/or the lateral strip belt width positioner, the upper fixing molded plate being buckled to the lateral positioning strip belt forming groove, and the upper fixing molded plate and the lower fixing molded plate flattening an upper surface and a lower surface of the lateral positioning strip belt or being shaped to meet a production requirement of a conveyor belt.

The upper fixed lateral positioning strip device includes a screw rod, a clamp, a buckling groove or a fixing pin, the upper fixed lateral positioning strip device and the lower fixed lateral positioning strip device are buckled by means of the screw rod or the clamp or the buckling groove or the fixing pin, when the screw rod is used for buckling connection, the upper fixed lateral positioning strip device is provided with an upper connection hole, the lower fixed lateral positioning strip device is provided with a lower connection screw hole, and the screw rod penetrates the upper connection hole and is screwed into the lower connection screw hole to fix the upper fixed lateral positioning strip device and the lower fixed lateral positioning strip device.

An upper positioning lateral strip semicircular hole is provided in the upper fixed lateral positioning strip device, a lower positioning lateral strip semicircular hole is provided in the lower fixed lateral positioning strip device, the extra-belt lateral positioning strip is provided in the lower positioning lateral strip semicircular hole, the upper positioning lateral strip semicircular hole and the lower positioning lateral strip semicircular hole are closed to position the extra-belt lateral positioning strip, and the rubber body is wrapped around the intra-belt lateral positioning strip to form the lateral positioning strip toothed belt.

The upper fixed lateral positioning strip device is positioned on the upper fixing molded plate, the lower fixed lateral positioning strip device is positioned on the lower fixing molded plate, the extra-belt lateral positioning strip is provided in the lateral strip fixing hole or the lateral strip fixing groove, and the rubber body is wrapped around the intra-belt lateral positioning strip to form the lateral positioning strip toothed belt.

The lateral strip belt length positioner includes an accurate positioning lateral strip baffle hole and an accurate positioning lateral strip baffle, the accurate positioning lateral strip baffle hole being provided in an end, facing the inner side of the fixing molded plate, of the lateral strip fixing hole, the lateral strip belt length positioner is configured to position the accurate positioning lateral strip baffle to provide the accurate positioning lateral strip baffle on the lateral positioning strip in a penetrating mode, the extra-belt lateral positioning strip is placed into the fixed extra-belt lateral strip hole, the accurate positioning lateral strip baffle is pushed into the accurate positioning lateral strip baffle hole, the accurate positioning lateral strip baffle hole and the accurate positioning lateral strip baffle are configured to accurately position the lateral positioning strip, and the accurate positioning lateral strip baffle prevents the rubber body from entering the fixed extra-belt lateral strip hole.

The lateral positioning strip toothed belt includes a planar lateral positioning strip toothed belt or a leakage-resistant flange face lateral positioning strip toothed belt or a material-sliding-resistant patterned face lateral positioning strip toothed belt, when the material-sliding-resistant patterned face lateral positioning strip toothed belt is manufactured, the upper fixing molded plate or the lower fixing molded plate is provided with a material-sliding-resistant molded patterned groove, the material-sliding-resistant molded patterned groove is provided in the lateral positioning strip belt forming groove, and the rubber body flows into the material-sliding-resistant molded patterned groove to form the material-sliding-resistant patterned face lateral positioning strip toothed belt.

The groove type fixed lateral positioning strip device includes a left fixed lateral positioning groove and/or a right fixed lateral positioning groove, the extra-belt lateral positioning strips are provided in the left fixed lateral positioning groove and/or the right fixed lateral positioning groove, the left fixed lateral positioning groove is configured to fix a left side of the extra-belt lateral positioning strip, the right fixed lateral positioning groove is configured to fix a right side of the extra-belt lateral positioning strip, the groove type fixed lateral positioning strip device is provided with a groove fixing side strip mechanism fixed to the fixing molded plate each other, and the groove fixing side strip mechanism includes a thread type fixing mechanism, a pin type fixing mechanism, a fastener type fixing mechanism and a flange type fixing mechanism.

A reduction belt thickness plate is provided in the lateral positioning strip belt forming groove, the reduction belt thickness plate and the fixing molded plate are connected in a separated mode or integrated, a width of the reduction belt thickness plate is equal to that of a belt face of the lateral positioning strip toothed belt or smaller than that of the belt face of the lateral positioning strip toothed belt, when the width of the reduction belt thickness plate is smaller than that of the belt face of the lateral positioning strip toothed belt, the rubber body between the reduction belt thickness plate and the lateral strip belt length positioner forms a lateral positioning strip toothed belt flange, a diameter of the equidistant fixed lateral positioning strip hole is smaller than a thickness of the lateral positioning strip toothed belt, or equal to the thickness of the lateral positioning strip toothed belt, or larger than the thickness of the lateral positioning strip toothed belt, a diameter of the extra-belt lateral positioning strip is larger than or equal to the thickness of the lateral positioning strip toothed belt, and the extra-belt lateral positioning strip does not deform when bearing super-large tension.

The disclosure has the beneficial effects:

1. The fixing molded plate is configured to fix the lateral strip belt width positioner and/or the lateral strip belt length positioner, the lateral strip belt length positioner is provided on one side or two sides of the fixing molded plate, the lateral strip belt length positioner faces the inner side of the fixing molded plate to form the lateral positioning strip belt forming groove together with the lateral strip belt width positioner, the extra-belt lateral positioning strip is provided in the fixed lateral positioning strip groove, the intra-belt lateral positioning strip is provided in the lateral positioning strip belt forming groove, the upper fixed lateral positioning strip device and the lower fixed lateral positioning strip device buckle together, the front lateral strip belt width positioner and/or the rear lateral strip belt width positioner is provided at an end of the fixing molded plate, so as to buckle the lateral strip belt width positioner, the lateral strip belt length positioner and the fixing molded plate to form the lateral positioning strip belt forming groove, the intra-belt lateral positioning strip is provided in the lateral positioning strip belt forming groove, a rubber body is provided in the lateral positioning strip belt forming groove, the rubber body being wrapped around the intra-belt lateral positioning strip to form a lateral positioning strip toothed belt, the extra-belt lateral positioning strip forms a lateral positioning strip toothed belt on one side or two sides of the lateral positioning strip belt, a fixed extra-belt lateral strip hole is provided in a side portion of a hole type fixed lateral positioning strip device, the extra-belt lateral positioning strip is provided in the fixed extra-belt lateral strip hole, the hole type fixed lateral positioning strip device faces an inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body is wrapped around the intra-belt lateral positioning strip to form the lateral positioning strip toothed belt, the intra-belt lateral positioning strip is drawn out to form the perforated lateral positioning strip belt or the intra-belt lateral positioning strip and the rubber body are integrated. By means of the mold, the problem that an old mold may not produce the lateral positioning strip toothed belt is solved, the later positioning strip toothed belt is converted into a product with huge use value for improving the conveying production efficiency by means of the invention and use of the mold, the invention and use of the lateral positioning strip toothed belt avoids material spilling and leaking caused by frequent deviation of an old belt and an armor belt in operation, avoids abrasion the old belt and the armor belt to a guide chute, avoids tearing and breakage caused by deviation of the old belt and the armor belt, avoids faults of electric motor burnout, etc. caused by deviation of the old belt and the armor belt and overlarge cable-stayed resistance, and avoids serious manpower and material resource waste caused by frequent maintenance and replacement of the old belt and the armor belts on a using site, the process tool provided in the disclosure fills the process of providing the lateral positioning strip teeth on two sides of a rubber tape at home and abroad, has a reasonable structure, pointedly solves the production problem about the lateral positioning strip tooth belt, and has high practicability.

2. The lateral strip belt length positioner is positioned by means of the molded plate positioning strip groove or the molded plate positioning strip hole or the molded plate positioning strip flange or the molded plate positioning strip flat plate or the molded plate positioning strip clamping member, such that the lateral strip belt length positioner may not displace relative to the fixing molded plate, and the manufactured lateral strip belt length positioner is ensured to have high size precision and long service life.

3. The lower fixing molded plate is configured to position the lateral strip belt length positioner and/or the lateral strip belt width positioner, the upper fixing molded plate is buckled to the lateral positioning strip belt forming groove, and the upper fixing molded plate and the lower fixing molded plate flatten an upper surface and a lower surface of the lateral positioning strip belt or are shaped to meet a production requirement of a conveyor belt.

4. The extra-belt lateral positioning strip is provided in the lower positioning lateral strip semicircular hole, the upper positioning lateral strip semicircular hole and the lower positioning lateral strip semicircular hole are closed to position the extra-belt lateral positioning strip, the rubber body is wrapped around the intra-belt lateral positioning strip to form the lateral positioning strip toothed belt, the lower positioning lateral strip semicircular hole is beneficial to rapid placement of the lateral positioning strip, so as to determine a distance between the lateral positioning strips, the upper positioning lateral strip semicircular hole and the lower positioning lateral strip semicircular hole are closed to prevent the rubber body from covering the extra-belt lateral positioning strip, and when the lateral positioning strip toothed belt is completed, the upper fixing molded plate is moved away from the lateral strip belt length positioner, and the upper lateral strip belt length positioner is automatically separated from the lateral positioning strip toothed belt, so as to improve the manufacturing efficiency of the lateral positioning strip toothed belt.

5. The upper fixed lateral positioning strip device and the lower fixed lateral positioning strip device are buckled by means of the screw rod or the clamp or the buckling groove or the fixing pin, when the screw rod is used for buckling connection, the screw rod penetrates the upper connection hole and is screwed into the lower connection screw hole to fix the upper fixed lateral positioning strip device and the lower fixed lateral positioning strip device, so as to guarantee no relative displacement between the upper fixed lateral positioning strip device and the lower fixed lateral positioning strip device, a buckling seam is tight, the rubber body may not flow into the buckling seam, manufacturing precision is improved, and manpower and material resources needed by trimming are reduced.

6, The upper fixed lateral positioning strip device is directly positioned on the upper fixing molded plate, the lower fixed lateral positioning strip device is directly positioned on the lower fixing molded plate, the extra-belt lateral positioning strip is provided in the lateral strip fixing hole or the lateral strip fixing groove, the rubber body is wrapped around the intra-belt lateral positioning strip, the upper fixing molded plate is pressed and buckled on the lower fixing molded plate, the lateral positioning strip toothed belt is quickly formed, the upper fixing molded plate or the lower fixing molded plate is rapidly detached, and the fixed lateral positioning strip device needs no adjustment, such that the process of manufacturing the lateral positioning strip toothed belt is reduced, the production efficiency is improved, and manufacturing time and labor are saved.

7. The accurate positioning lateral strip baffle hole is provided in an end, facing the inner side of the fixing molded plate, of the lateral strip fixing hole, the lateral strip belt length positioner is configured to position the accurate positioning lateral strip baffle to provide the accurate positioning lateral strip baffle on the lateral positioning strip in a penetrating mode, the extra-belt lateral positioning strip is placed into the fixed extra-belt lateral strip hole, the accurate positioning lateral strip baffle is pushed into the accurate positioning lateral strip baffle hole, the accurate positioning lateral strip baffle hole and the accurate positioning lateral strip baffle are configured to accurately position the lateral positioning strip, and the accurate positioning lateral strip baffle prevents the rubber body from entering the fixed extra-belt lateral strip hole, so as to improve precision quality of the lateral positioning strip toothed belt.

8. When the material-sliding-resistant patterned face lateral positioning strip toothed belt is manufactured, the upper fixing molded plate or the lower fixing molded plate is provided with a material-sliding-resistant molded patterned groove, the material-sliding-resistant molded patterned groove is provided in the lateral positioning strip belt forming groove, and the rubber body flows into the material-sliding-resistant molded patterned groove to form the material-sliding-resistant patterned face lateral positioning strip toothed belt. By setting a shape of the fixing molded plate, each belt face of the lateral positioning strip toothed belt is manufactured, which enriches varieties and functions of the lateral positioning strip toothed belt.

9. When the upper fixed lateral positioning strip device and the lower fixed lateral positioning strip device are integrated, a fixed extra-belt lateral positioning strip through hole is provided in the lateral strip belt length positioner or a fixed extra-belt lateral positioning strip groove is formed in the lateral strip belt length positioner so as to form a groove type fixed lateral positioning strip device, the extra-belt lateral positioning strip is provided in the fixed extra-belt lateral positioning strip groove, the groove type fixed lateral positioning strip device faces the inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body being wrapped around the intra-belt lateral positioning strip to form the lateral positioning strip toothed belt, the groove type fixed lateral positioning strip device avoids an up-down buckling error caused when the upper fixed lateral positioning strip device and the lower fixed lateral positioning strip device are buckled to the extra-belt lateral positioning strip in a separated mode, a thickness of the fixed lateral positioning strip device is increased, the process for manufacturing the fixed lateral positioning strip device is simple, and the service life of the fixed lateral positioning strip device is prolonged.

10. When the upper fixed lateral positioning strip device and the lower fixed lateral positioning strip device separated from each other are used, the groove type lower fixed lateral positioning strip device is provided on the fixing molded plate, the groove type lower fixed lateral positioning strip device is provided with a plurality of equidistant fixed lateral positioning strip grooves, the plurality of upper fixed lateral positioning strip blocks match the plurality of equidistant fixed lateral positioning strip grooves to form a plurality of equidistant fixed lateral positioning strip holes, and the extra-belt lateral positioning strip is provided in the plurality of equidistant fixed lateral positioning strip holes. The plurality of equidistant fixed lateral positioning strip grooves are used for accurately equidistantly positioning the lateral positioning strips, such that manufacturing precision of the lateral positioning strip toothed belt is improved, the distances between the extra-belt lateral positioning strips are equal, accurate matching between the extra-belt lateral positioning strips and a driving gear is facilitated, accurate matching between a roller chain and the lateral positioning strip toothed belt is facilitated, faults of chain climbing, tooth clamping, etc. caused by unequal distances among the multiple extra-belt lateral positioning strips and further improper meshing with the driving gear are avoided, it is guaranteed that the lateral positioning strip toothed belt runs without noise, and service life of the roller chain is prolonged.

11. The extra-belt lateral positioning strips are provided in the left fixed lateral positioning groove and/or the right fixed lateral positioning groove, the left fixed lateral positioning groove is configured to fix a left side of the extra-belt lateral positioning strip, the right fixed lateral positioning groove is configured to fix a right side of the extra-belt lateral positioning strip, the groove type fixed lateral positioning strip device is provided with a groove fixing side strip mechanism fixed to the fixing molded plate, the left fixed lateral positioning groove and/or the right fixed lateral positioning groove avoid the defects that an upper fixed lateral positioning strip device and a lower fixed lateral positioning strip device are thinner, short in service life, etc. due to the limitation of the thickness of the lateral positioning strip toothed belt, and service life of the lateral strip belt length positioner is prolonged.

12. A reduction belt thickness plate is provided in the lateral positioning strip belt forming groove, the reduction belt thickness plate and the fixing molded plate are connected in a separated mode or integrated, a width of the reduction belt thickness plate is equal to that of a belt face of the lateral positioning strip toothed belt or smaller than that of the belt face of the lateral positioning strip toothed belt, on the premise that the service life of the lateral positioning strip toothed belt is guaranteed, the weight of the whole lateral positioning strip toothed belt is reduced by using the reduction belt thickness plate, materials are saved, when the width of the reduction belt thickness plate is smaller than that of the belt face of the lateral positioning strip toothed belt, the rubber body between the reduction belt thickness plate and the lateral strip belt length positioner forms a lateral positioning strip toothed belt flange, a diameter of the equidistant fixed lateral positioning strip hole is smaller than a thickness of the lateral positioning strip toothed belt, or equal to the thickness of the lateral positioning strip toothed belt, or larger than the thickness of the lateral positioning strip toothed belt, when a diameter of the extra-belt lateral positioning strip is larger than or equal to the thickness of the lateral positioning strip toothed belt, the extra-belt lateral positioning strip may bear super-large tension and does not deform, and is wear-resistant, so as to improve tensile strength of the lateral positioning strip toothed belt, improve transportation capacity of the lateral positioning strip toothed belt, and prolong the service life of the lateral positioning strip toothed belt.

Figure 1:
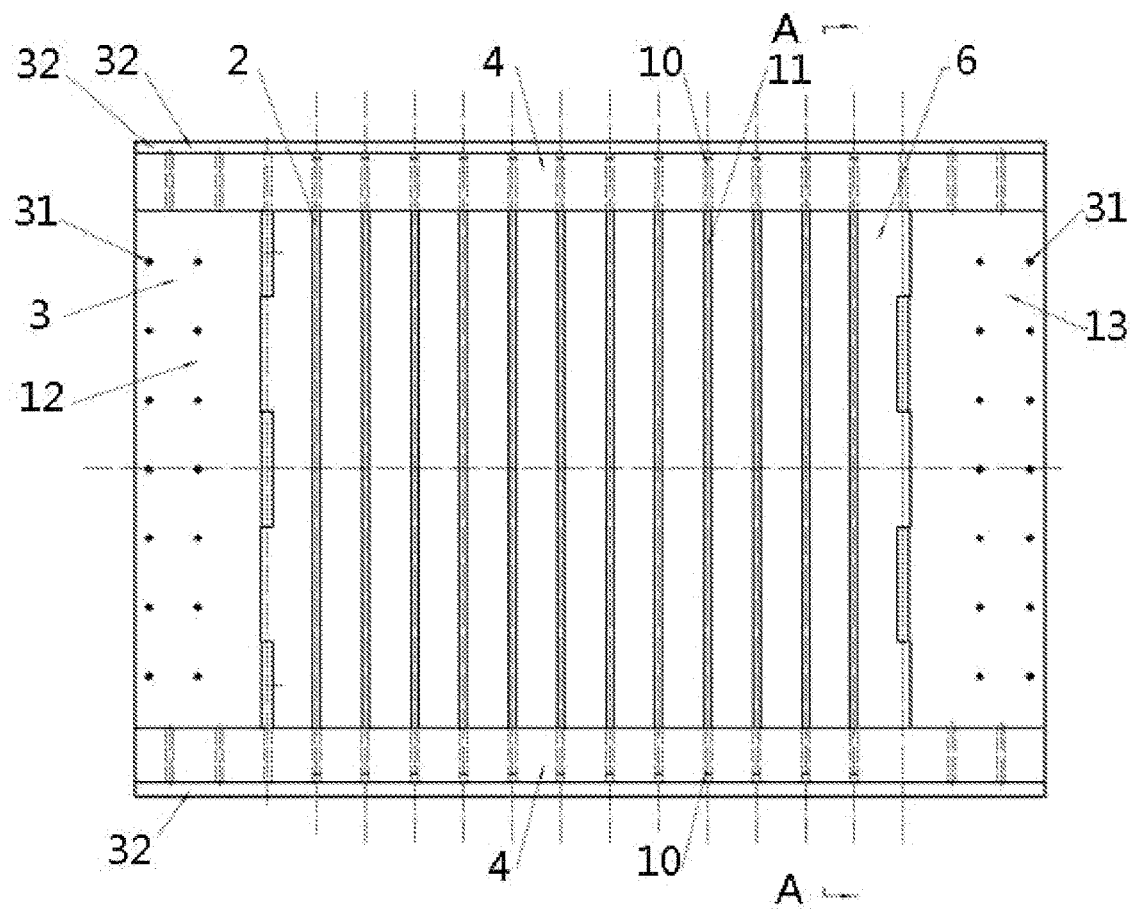
FIG. 1 is a structural schematic diagram of a manufacturing process tool for a lateral positioning strip toothed belt in Embodiment 1.
Figure 2:
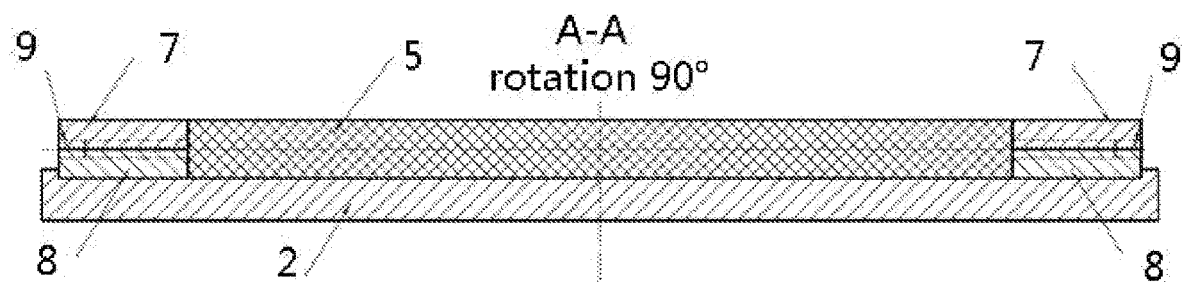
FIG. 2 is a schematic diagram after rotation of section A-A in FIG. 1.
Figure 3:
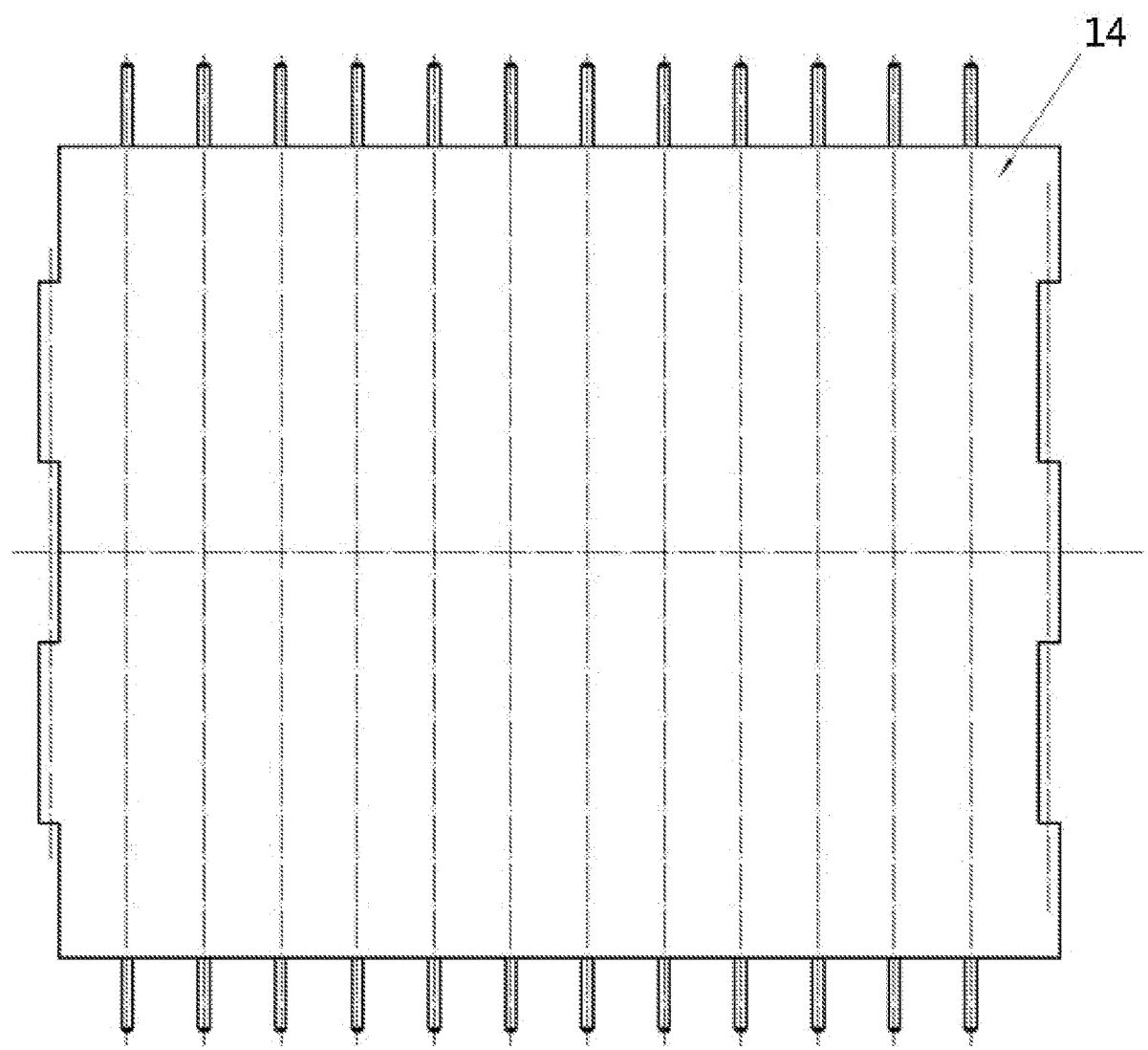
FIG. 3 is a structural schematic diagram of a lateral positioning strip toothed belt in Embodiment 1.
Figure 4:
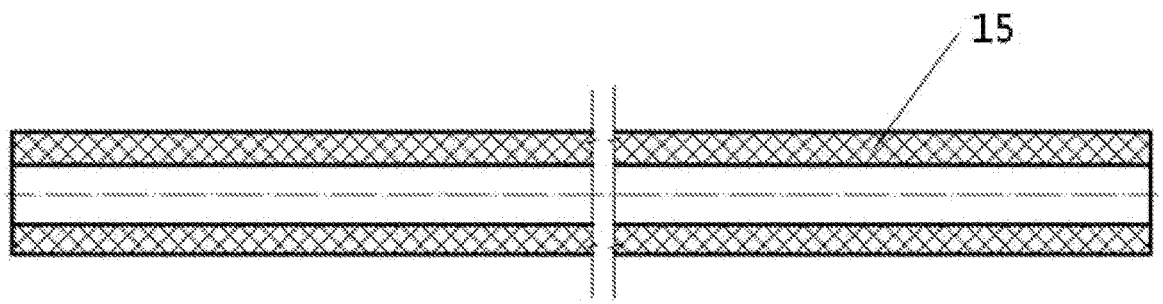
FIG. 4 is a partial sectional view of a perforated lateral positioning strip belt in Embodiment 1.

In figures: 1-lateral positioning strip, 2-fixing molded plate, 3-lateral strip belt width positioner, 4-lateral strip belt length positioner, 5-rubber body, 6-lateral positioning strip belt forming groove, 7-upper fixed lateral positioning strip device, 8-lower fixed lateral positioning strip device, 9-fixed lateral positioning strip groove, 10-extra-belt lateral positioning strip, 11-intra-belt lateral positioning strip, 12-front lateral strip belt width positioner, 13-rear lateral strip belt width positioner, 14-lateral positioning strip toothed belt, 15-perforated lateral positioning strip belt, 16-hole type fixed lateral positioning strip device, 17-fixed extra-belt lateral strip hole, 18-molded plate positioning strip groove, 19-molded plate positioning strip clamping member, 20-upper fixing molded plate, 21-lower fixing molded plate, 22-screw rod, 23-upper connection hole, 24-lower connection screw hole, 25-upper positioning lateral strip semicircular hole, 26-lower positioning lateral strip semicircular hole, 27-accurate positioning lateral strip baffle hole, 28-accurate positioning lateral strip baffle, 29-material-sliding-resistant patterned face lateral positioning strip toothed belt, 30-material-sliding-resistant molded patterned groove, 31-molded plate positioning strip hole, 32-molded plate positioning strip flange, 33-fixed extra-belt lateral positioning strip through hole, 34-fixed extra-belt lateral positioning strip groove, 35-groove type fixed lateral positioning strip device, 36-left fixed lateral positioning groove, 37-right fixed lateral positioning groove, 38-groove fixing side strip mechanism, 39-pin type fixing mechanism, 40-fastener type fixing mechanism, 41-flange type fixing mechanism, 42-reduction belt thickness plate, 43-equidistant fixed lateral positioning strip hole, and 44-lateral positioning strip toothed belt flange.

DETAILED DESCRIPTION OF THE EMBODIMENTS

Embodiment 1

As shown in FIGS. 1-4, a manufacturing process tool for lateral positioning strip toothed belt includes a lateral positioning strip 1, a fixing molded plate 2, a lateral strip belt width positioner 3, a lateral strip belt length positioner 4 and a rubber body 5, where the fixing molded plate 2 is configured to fix the lateral strip belt width positioner 3, the lateral strip belt length positioners 4 are provided on two sides of the fixing molded plate 2, the lateral strip belt length positioner 4 faces an inner side of the fixing molded plate 2 to form a lateral positioning strip belt forming groove 6 together with the lateral strip belt width positioner 3, the lateral strip belt length positioner 4 includes an upper fixed lateral positioning strip device 7 and a lower fixed lateral positioning strip device 8, when the upper fixed lateral positioning strip device 7 and the lower fixed lateral positioning strip device 8 are connected in a separated mode, the upper fixed lateral positioning strip device 7 and the lower fixed lateral positioning strip device 8 are provided with the fixed lateral positioning strip groove 9, the lateral positioning strip 1 includes an extra-belt lateral positioning strip 10 and an intra-belt lateral positioning strip 11, the extra-belt lateral positioning strip 10 being provided in the fixed lateral positioning strip groove 9, and the intra-belt lateral positioning strip 11 being provided in the lateral positioning strip belt forming groove 6, the upper fixed lateral positioning strip device 7 and the lower fixed lateral positioning strip device 8 are buckled, the lateral strip belt width positioner 3 includes a front lateral strip belt width positioner 12 and a rear lateral strip belt width positioner 13, the front lateral strip belt width positioner 12 and the rear lateral strip belt width positioner 13 are provided at an end of the fixing molded plate 2, the lateral strip belt width positioner 3, the lateral strip belt length positioner 4 and the fixing molded plate 2 are buckled to form a lateral positioning strip belt forming groove 6, the intra-belt lateral positioning strip 11 is provided in the lateral positioning strip belt forming groove 6, the rubber body 5 is provided in the lateral positioning strip belt forming groove 6, the rubber body 5 is wrapped around the intra-belt lateral positioning strip 11 to form a lateral positioning strip toothed belt 14, the intra-belt lateral positioning strip 11 and the rubber body 5 are integrated, and the extra-belt lateral positioning strip 10 forms a lateral positioning strip toothed belt 14 on two sides of the lateral positioning strip 1;

the intra-belt lateral positioning strip 11 may also be drawn out to form a perforated lateral positioning strip belt 15;

the fixing molded plate 2 may also be configured to fix the lateral strip belt length positioner 4;

the lateral strip belt length positioner 4 may also be provided on one side of the fixing molded plate 2;

the upper fixed lateral positioning strip device 7 and the lower fixed lateral positioning strip device 8 are connected in a separated manner or integrated;

the upper fixed lateral positioning strip device 7 or the lower fixed lateral positioning strip device 8 may also be provided with a fixed lateral positioning strip groove 9; and the lateral strip belt width positioner 3 includes a front lateral strip belt width positioner 12 or a rear lateral strip belt width positioner 13, the front lateral strip belt width positioner 12 or the rear lateral strip belt width positioner 13 is provided at an end of the fixing molded plate 2.

Embodiment 2

Figure 5:
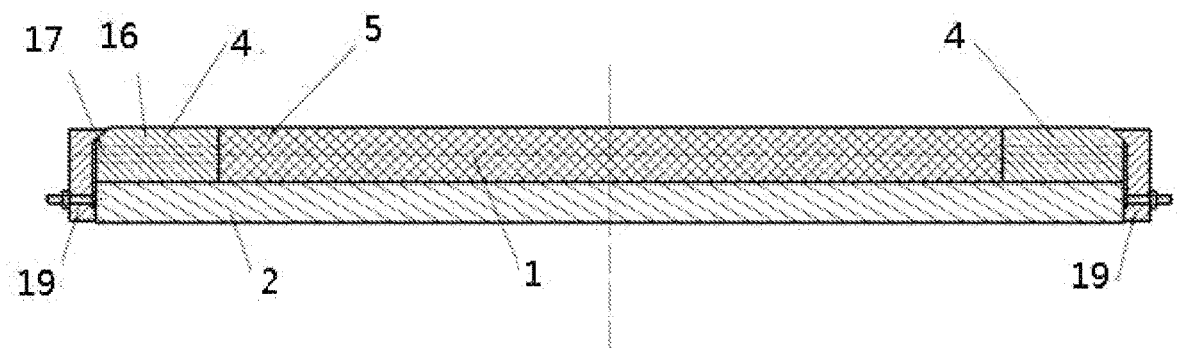
FIG. 5 is a partial sectional view of a manufacturing process tool for a lateral positioning strip toothed belt in Embodiment 2.
Figure 6:
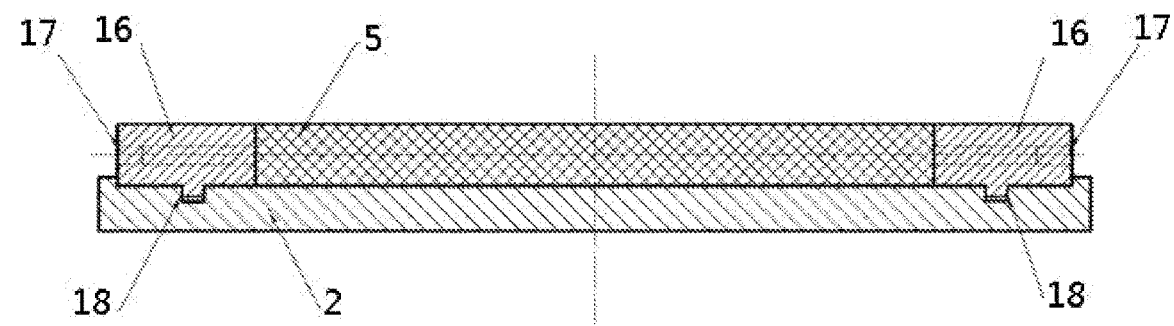
FIG. 6 is a partial sectional view of the manufacturing process tool for a lateral positioning strip toothed belt in Embodiment 2.

As shown in FIGS. 5-6, when the upper fixed lateral positioning strip device 7 and the lower fixed lateral positioning strip device 8 are integrated, the upper fixed lateral positioning strip device 7 and the lower fixed lateral positioning strip device 8 are combined to form a hole type fixed lateral positioning strip device 16, a fixed extra-belt lateral strip hole 17 is provided in a side portion of the hole type fixed lateral positioning strip device 16, the extra-belt lateral positioning strip 10 is provided in the fixed extra-belt lateral strip hole 17, the hole type fixed lateral positioning strip device 16 faces an inner side of the fixing molded plate 2 to form a lateral positioning strip belt forming groove 6 together with the lateral strip belt width positioner 3, the intra-belt lateral positioning strip 11 is provided in the lateral positioning strip belt forming groove 6, the rubber body 5 is provided in the lateral positioning strip belt forming groove 6, the rubber body 5 is wrapped around the intra-belt lateral positioning strip 11 to form the lateral positioning strip toothed belt 14; the fixing molded plate 2 includes a molded plate positioning strip groove 18, the molded plate positioning strip groove 18 being configured to position the lateral strip belt length positioner 4;

the fixing molded plate 2 includes a molded plate positioning strip clamping member 19, the molded plate positioning strip clamping member 19 being configured to position the lateral strip belt length positioner 4; and the fixing molded plate 2 may also includes a molded plate positioning strip hole 31, a molded plate positioning strip flange 32 or a molded plate positioning strip flat plate, the molded plate positioning strip hole 31 or the molded plate positioning strip flange 32 or the molded plate positioning strip flat plate being configured to position the lateral strip belt length positioner 4.

The remaining is the same as in Embodiment 1.

Embodiment 3

Figure 7:
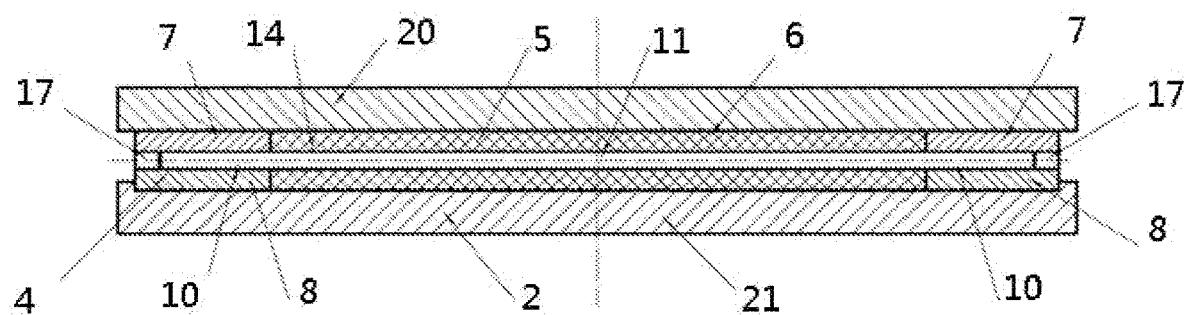
FIG. 7 is a partial sectional view of a manufacturing process tool for a lateral positioning strip toothed belt in Embodiment 3.

As shown in FIG. 7, the fixing molded plate 2 includes an upper fixing molded plate 20 and a lower fixing molded plate 21, the lower fixing molded plate 21 being configured to position the lateral strip belt length positioner 4, the upper fixing molded plate 20 being buckled to the lateral positioning strip belt forming groove 6, and the upper fixing molded plate 20 and the lower fixing molded plate 21 flattening an upper surface and a lower surface of the lateral positioning strip 1;

the upper fixed lateral positioning strip device 7 is positioned on the upper fixing molded plate 20, the lower fixed lateral positioning strip device 8 is positioned on the lower fixing molded plate 21, the extra-belt lateral positioning strip 10 is provided in the fixed extra-belt lateral strip hole 17, and the rubber body 5 is wrapped around the intra-belt lateral positioning strip 11 to form the lateral positioning strip toothed belt 14;

the extra-belt lateral positioning strip 10 may also be provided in the lateral strip fixing groove; and the upper fixing molded plate 20 and the lower fixing molded plate 21 may also be shaped to meet a production requirement of a conveyor belt.

The remaining is the same as in Embodiment 1.

Embodiment 4

Figure 8:
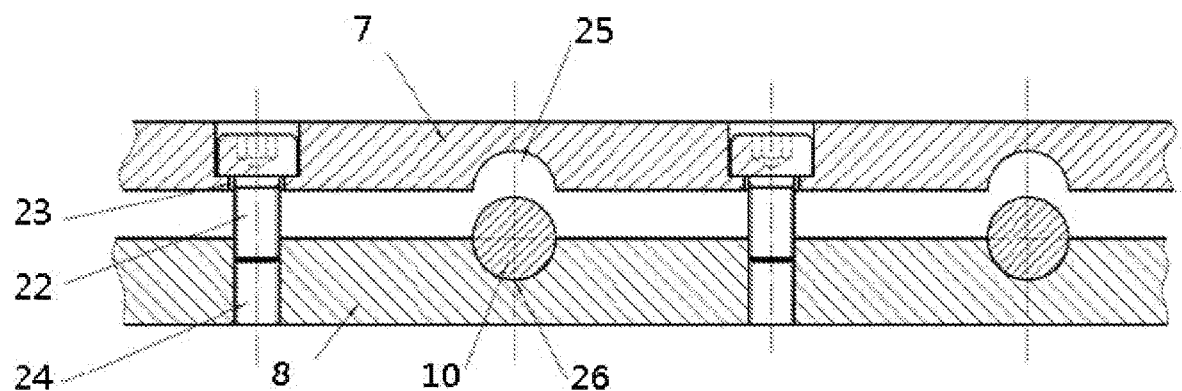
FIG. 8 is a partial sectional view of a manufacturing process tool for a lateral positioning strip toothed belt in Embodiment 4.

As shown in FIG. 8, the upper fixed lateral positioning strip device 7 includes a screw rod 22, the upper fixed lateral positioning strip device 7 and the lower fixed lateral positioning strip device 8 are buckled by means of the screw rod 22, when the screw rod 22 is used for buckling connection, the upper fixed lateral positioning strip device 7 is provided with an upper connection hole 23, the lower fixed lateral positioning strip device 8 is provided with a lower connection screw hole 24, and the screw rod 22 penetrates the upper connection hole 23 and is screwed into the lower connection screw hole 24 to fix the upper fixed lateral positioning strip device 7 and the lower fixed lateral positioning strip device 8;

an upper positioning lateral strip semicircular hole 25 is provided in the upper fixed lateral positioning strip device 7, a lower positioning lateral strip semicircular hole 26 is provided in the lower fixed lateral positioning strip device 8, the extra-belt lateral positioning strip 10 is provided in the lower positioning lateral strip semicircular hole 26, the upper positioning lateral strip semicircular hole 25 and the lower positioning lateral strip semicircular hole 26 are closed to position the extra-belt lateral positioning strip 10, and the rubber body 5 is wrapped around the intra-belt lateral positioning strip 11 to form the lateral positioning strip toothed belt 14; and the upper fixed lateral positioning strip device 7 may also include a clamp, a buckling groove or a fixing pin, and the upper fixed lateral positioning strip device 7 and the lower fixed lateral positioning strip device 8 are buckled by means of the clamp or the buckling groove or the fixing pin.

The remaining is the same as in Embodiment 1.

Embodiment 5

Figure 9:
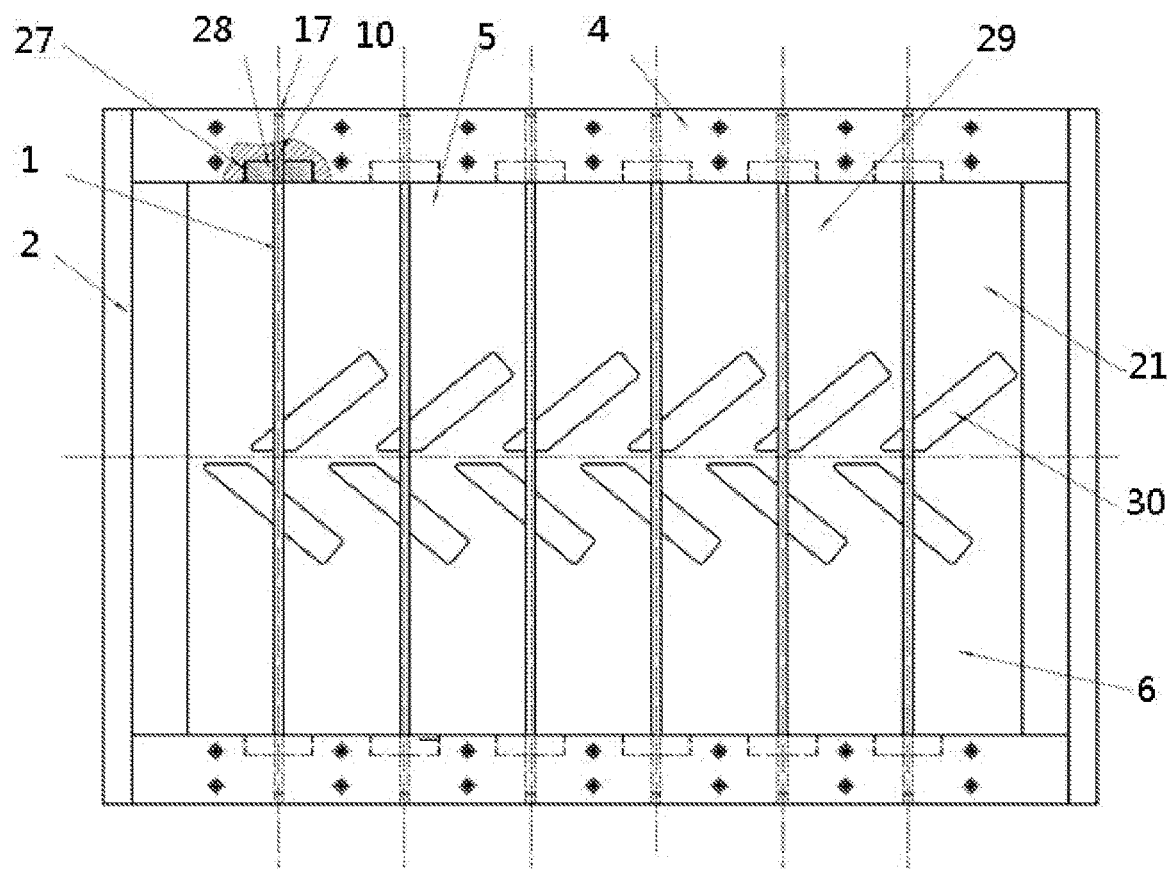
FIG. 9 is a structural schematic diagram of a manufacturing process tool for a lateral positioning strip toothed belt in Embodiment 5.

As shown in FIG. 9, the lateral strip belt length positioner 4 includes an accurate positioning lateral strip baffle hole 27 and an accurate positioning lateral strip baffle 28, the accurate positioning lateral strip baffle hole 27 being provided in an end, facing an inner side of the fixing molded plate 2, of the fixed extra-belt lateral strip hole 17, the lateral strip belt length positioner 4 is configured to position the accurate positioning lateral strip baffle 28 to provide the accurate positioning lateral strip baffle 28 on the lateral positioning strip 1 in a penetrating mode, the extra-belt lateral positioning strip 10 is placed into the fixed extra-belt lateral strip hole 17, the accurate positioning lateral strip baffle 28 is pushed into the accurate positioning lateral strip baffle hole 27, the accurate positioning lateral strip baffle hole 27 and the accurate positioning lateral strip baffle 28 are configured to accurately position the lateral positioning strip 1, and the accurate positioning lateral strip baffle 28 prevents the rubber body 5 from entering the fixed extra-belt lateral strip hole 17;

the lateral positioning strip toothed belt 14 includes a material-sliding-resistant patterned face lateral positioning strip toothed belt 29, when the material-sliding-resistant patterned face lateral positioning strip toothed belt 29 is manufactured, the upper fixing molded plate 20 or the lower fixing molded plate 21 is provided with a material-sliding-resistant molded patterned groove 30, the material-sliding-resistant molded patterned groove 30 is provided in the lateral positioning strip belt forming groove 6, and the rubber body 5 flows into the material-sliding-resistant molded patterned groove 30 to form the material-sliding-resistant patterned face lateral positioning strip toothed belt 29; and the lateral positioning strip toothed belt 14 may also include a planar lateral positioning strip toothed belt or a leakage-resistant flange face lateral positioning strip toothed belt.

The remaining is the same as in Embodiment 1.

Embodiment 6

Figure 10:
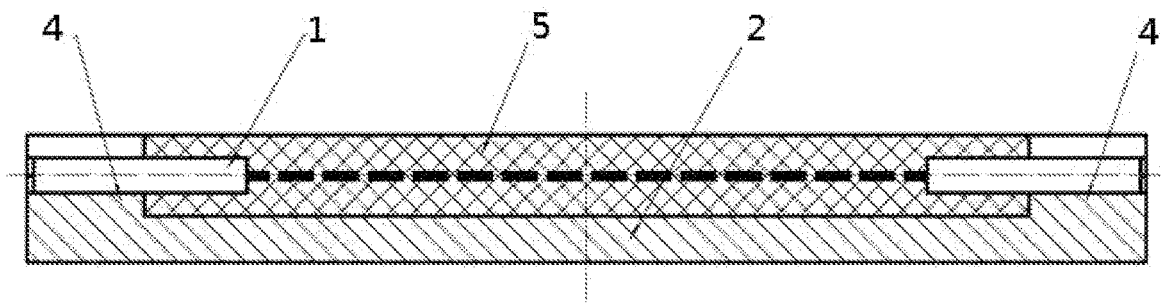
FIG. 10 is a partial sectional view of the manufacturing process tool for a lateral positioning strip toothed belt in Embodiment 6.
Figure 11:
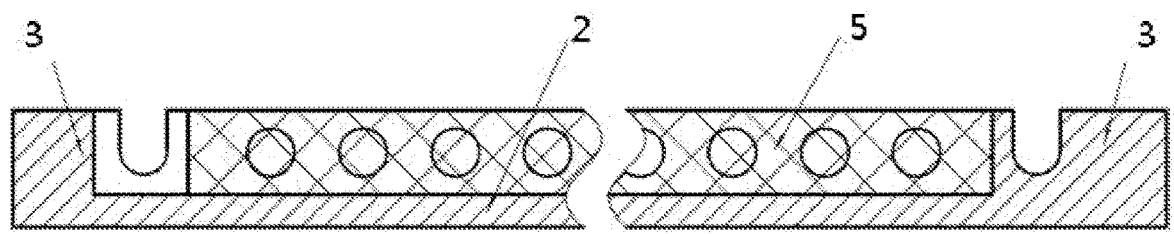
FIG. 11 is a partial sectional view of the manufacturing process tool for a lateral positioning strip toothed belt in Embodiment 6.

As shown in FIGS. 10-11, a manufacturing process tool for lateral positioning strip toothed belt includes a lateral positioning strip 1, a fixing molded plate 2, a lateral strip belt width positioner 3, a lateral strip belt length positioner 4 and a rubber body 5, the lateral strip belt length positioner 4 and the fixing molded plate 2 are integrated, and the lateral strip belt width positioner 3 and the fixing molded plate 2 are integrated.

The remaining is the same as in Embodiment 1.

Embodiment 7

Figure 12:
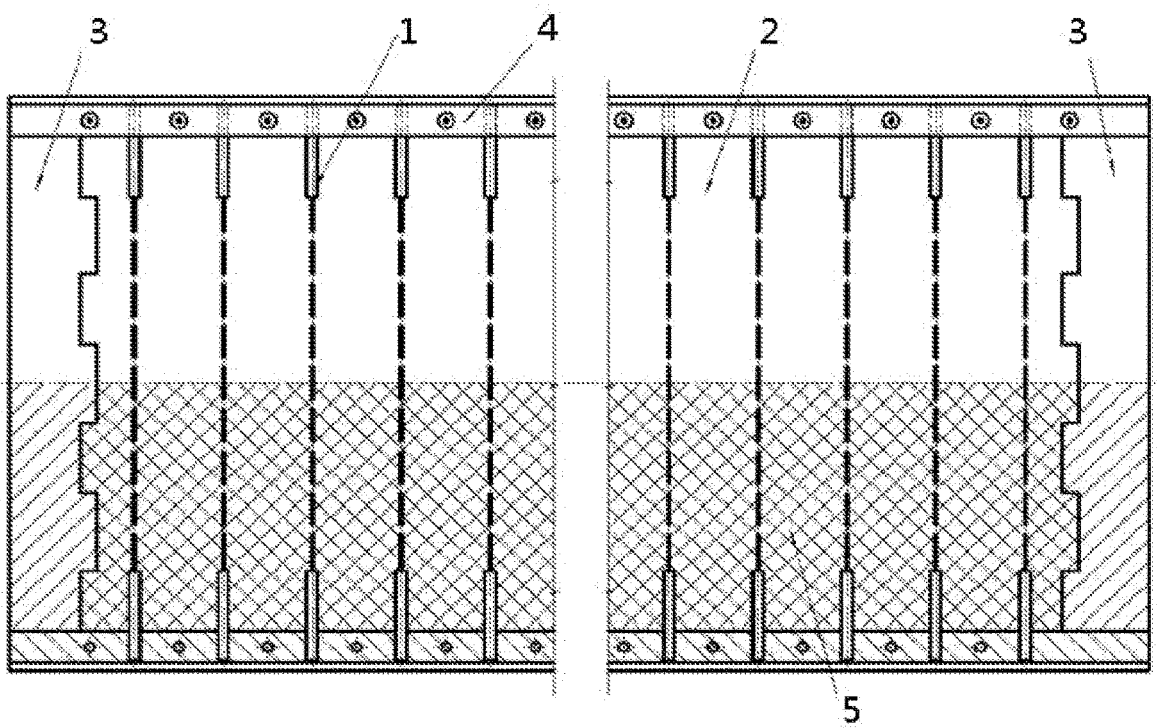
FIG. 12 is a partial sectional view of the manufacturing process tool for a lateral positioning strip toothed belt in Embodiment 7.
Figure 13:
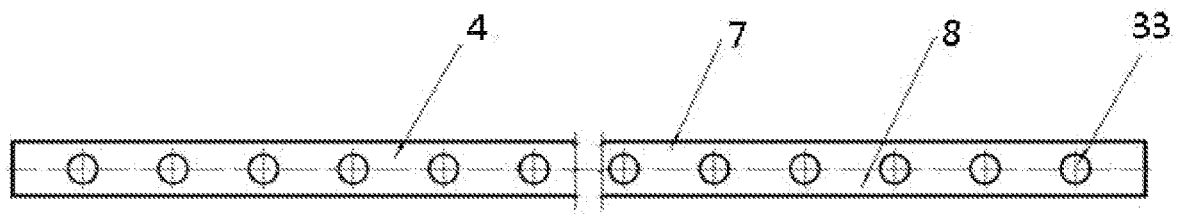
FIG. 13 is a structural schematic diagram of a lateral strip belt length positioner of the manufacturing process tool for a lateral positioning strip toothed belt in Embodiment 7.

As shown in FIGS. 12-13, a manufacturing process tool for lateral positioning strip toothed belt includes a lateral positioning strip 1, a fixing molded plate 2, a lateral strip belt width positioner 3, a lateral strip belt length positioner 4 and a rubber body 5, where the lateral strip belt length positioner 4 includes an upper fixed lateral positioning strip device 7 and a lower fixed lateral positioning strip device 8, and when the upper fixed lateral positioning strip device 7 and the lower fixed lateral positioning strip device 8 are integrated, a fixed extra-belt lateral positioning strip through hole 33 is provided in the lateral strip belt length positioner 4.

The remaining is the same as in Embodiment 1.

Embodiment 8

Figure 14:
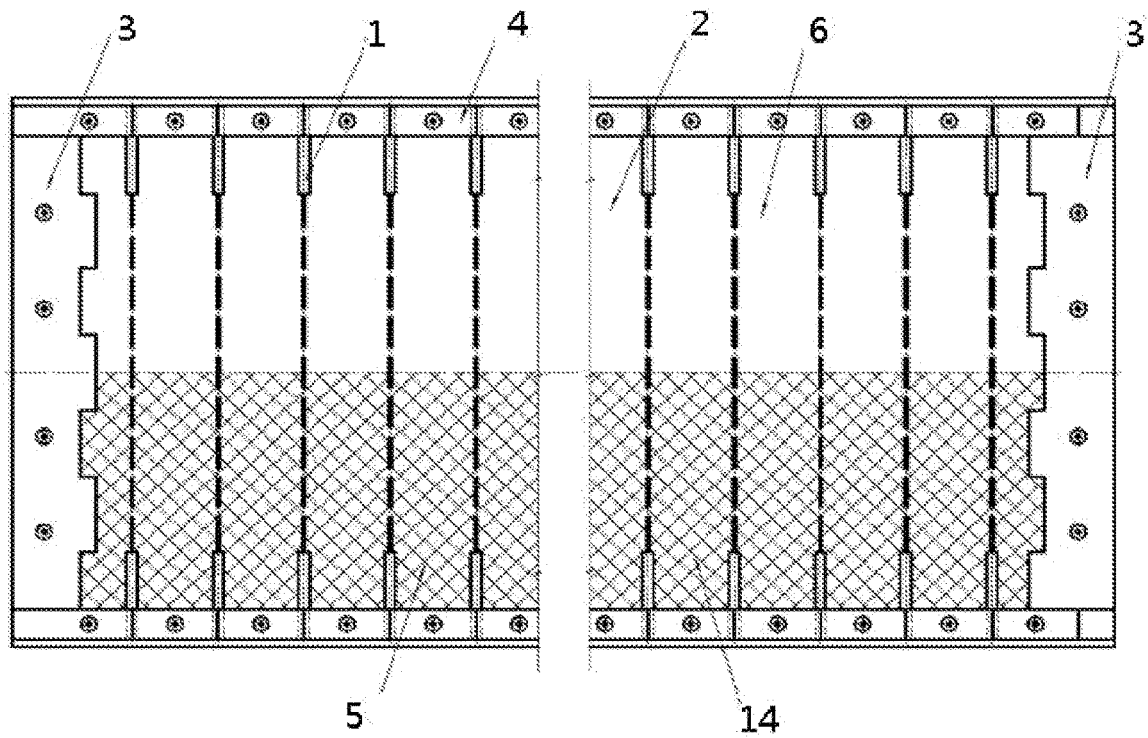
FIG. 14 is a partial sectional view of a manufacturing process tool for a lateral positioning strip toothed belt in Embodiment 8.
Figure 15:
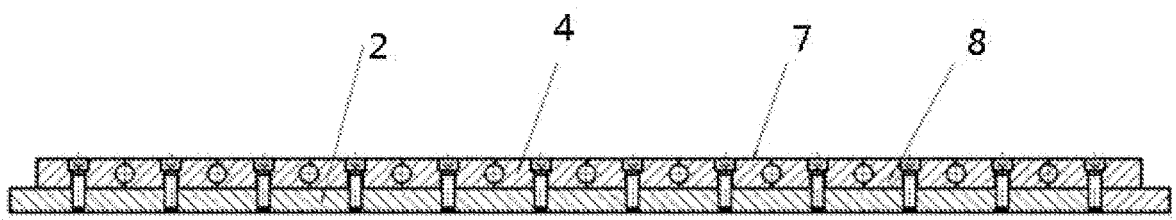
FIG. 15 is a partial sectional view of the manufacturing process tool for a lateral positioning strip toothed belt in Embodiment 8.
Figure 16:
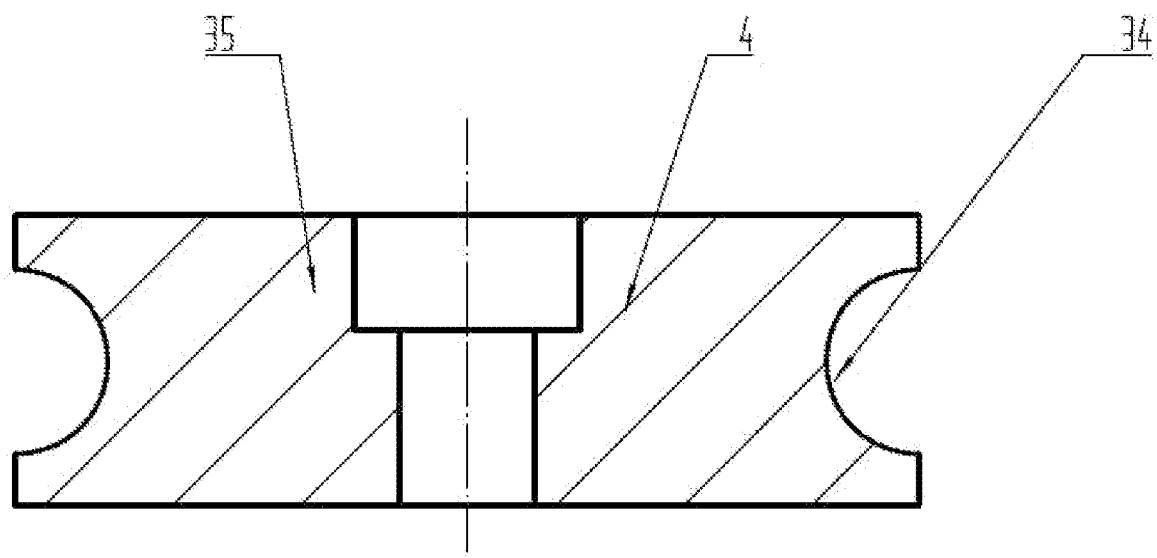
FIG. 16 is a structural schematic diagram of a lateral strip belt length positioner of the manufacturing process tool for a lateral positioning strip toothed belt in Embodiment 8.

As shown in FIGS. 14-16, a manufacturing process tool for lateral positioning strip toothed belt includes a lateral positioning strip 1, a fixing molded plate 2, a lateral strip belt width positioner 3, a lateral strip belt length positioner 4 and a rubber body 5, where the lateral strip belt length positioner 4 includes an upper fixed lateral positioning strip device 7 and a lower fixed lateral positioning strip device 8, when the upper fixed lateral positioning strip device 7 and the lower fixed lateral positioning strip device 8 are integrated, a fixed extra-belt lateral positioning strip groove 34 is provided in the lateral strip belt length positioner 4 so as to form a groove type fixed lateral positioning strip device 35, the extra-belt lateral positioning strip 10 is provided in the fixed extra-belt lateral positioning strip groove 34, the groove type fixed lateral positioning strip device 35 faces an inner side of the fixing molded plate 2 to form a lateral positioning strip belt forming groove 6 together with the lateral strip belt width positioner 3, the intra-belt lateral positioning strip 11 is provided in the lateral positioning strip belt forming groove 6, the rubber body 5 is provided in the lateral positioning strip belt forming groove 6, the rubber body 5 being wrapped around the intra-belt lateral positioning strip 11 to form a lateral positioning strip toothed belt 14, the intra-belt lateral positioning strip 11 is drawn out to form the perforated lateral positioning strip belt or the intra-belt lateral positioning strip 11 and the rubber body 5 are integrated.

The remaining is the same as in Embodiment 1.

Embodiment 9

Figure 17:
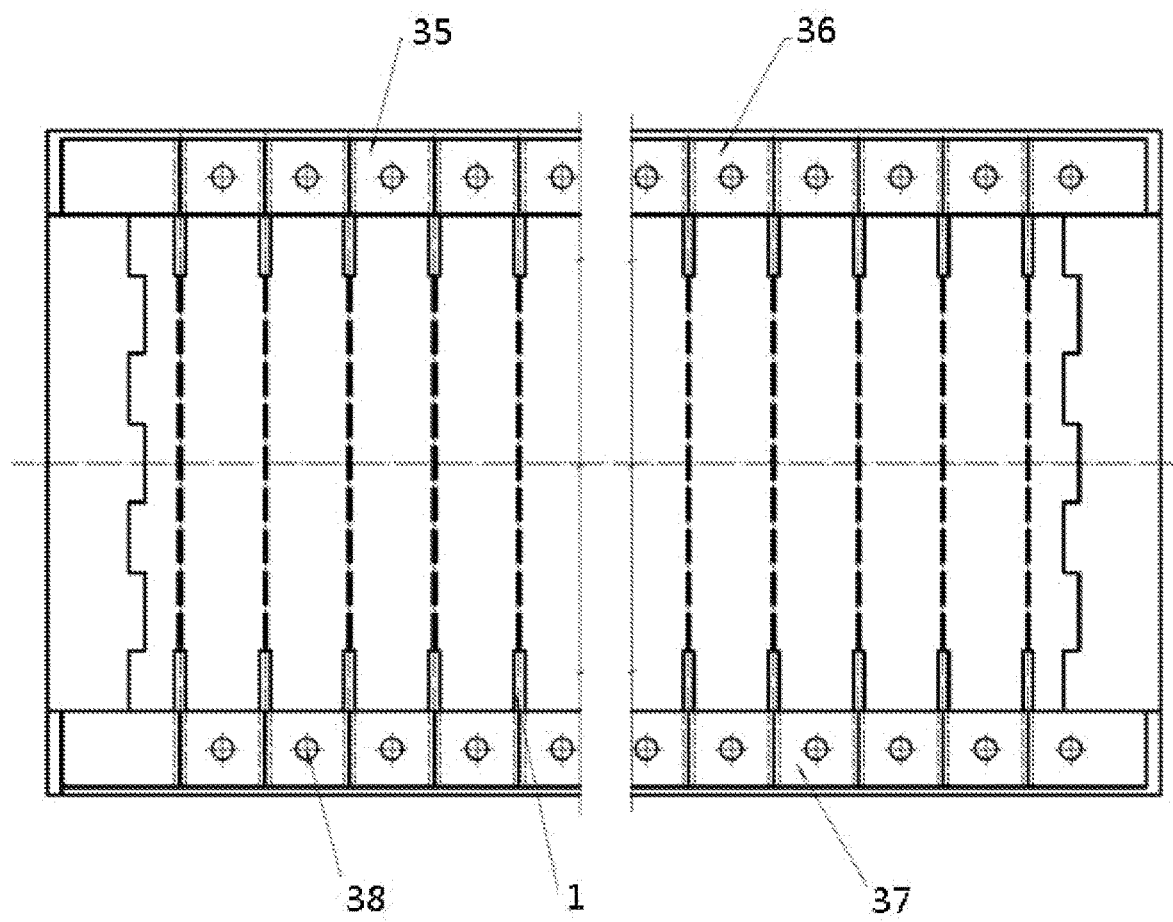
FIG. 17 is a partial sectional view of a manufacturing process tool for a lateral positioning strip toothed belt in Embodiment 9.
Figure 18:
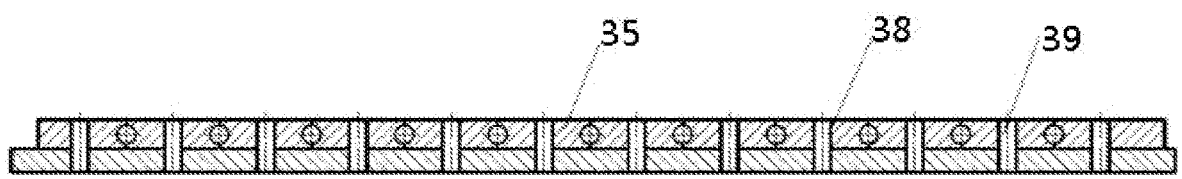
FIG. 18 is a partial sectional view of the manufacturing process tool for a lateral positioning strip toothed belt in Embodiment 9.

As shown in FIGS. 17-18, the groove type fixed lateral positioning strip device 35 includes a left fixed lateral positioning groove 36 and/or a right fixed lateral positioning groove 37, the extra-belt lateral positioning strips 10 are provided in the left fixed lateral positioning groove 36 and/or the right fixed lateral positioning groove 37, the left fixed lateral positioning groove 36 is configured to fix a left side of the extra-belt lateral positioning strip 1, the right fixed lateral positioning groove 37 is configured to fix a right side of the extra-belt lateral positioning strip 1, the groove type fixed lateral positioning strip device 35 is provided with a groove fixing side strip mechanism 38 fixed to the fixing molded plate 2 each other, and the groove fixing side strip mechanism 38 includes a pin type fixing mechanism 39, or may include a thread type fixing mechanism, a fastener type fixing mechanism, a flange type fixing mechanism, etc.

The remaining is the same as in Embodiment 1.

Embodiment 10

Figure 19:
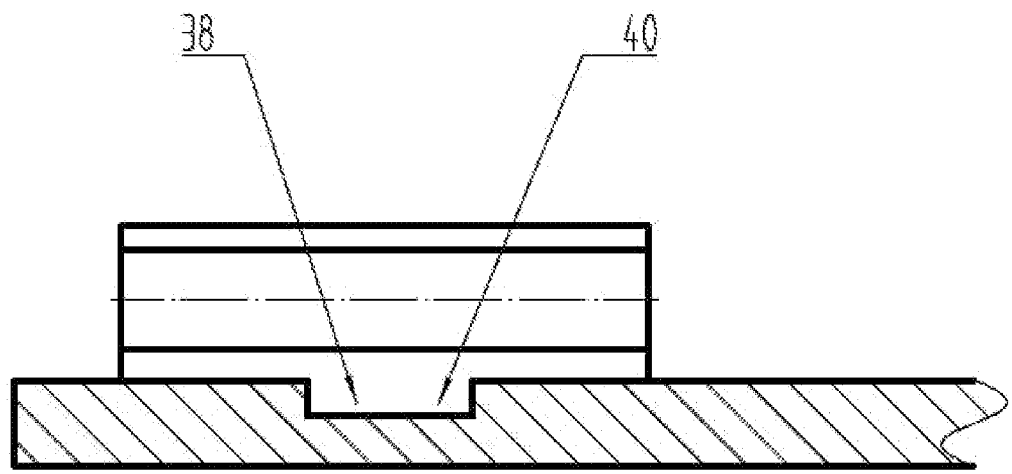
FIG. 19 is a partial sectional view of a manufacturing process tool for a lateral positioning strip toothed belt in Embodiment 10.

As shown in FIG. 19, the groove fixing side strip mechanism 38 is a fastener type fixing mechanism 40, or may be a thread type fixing mechanism, a pin type fixing mechanism, a flange type fixing mechanism, etc.

The remaining is the same as in Embodiment 9.

Embodiment 11

Figure 20:
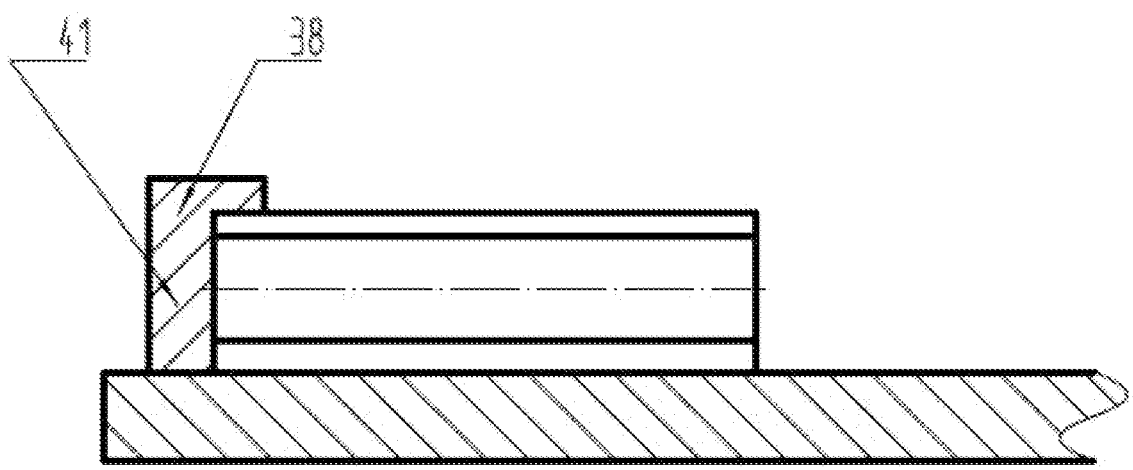
FIG. 20 is a partial sectional view of a manufacturing process tool for a lateral positioning strip toothed belt in Embodiment 11.

As shown in FIG. 20, the groove fixing side strip mechanism 38 is a flange type fixing mechanism 41, or may be a thread type fixing mechanism, a pin type fixing mechanism, a fastener type fixing mechanism, etc.

The remaining is the same as in Embodiment 9.

Embodiment 12

Figure 21:
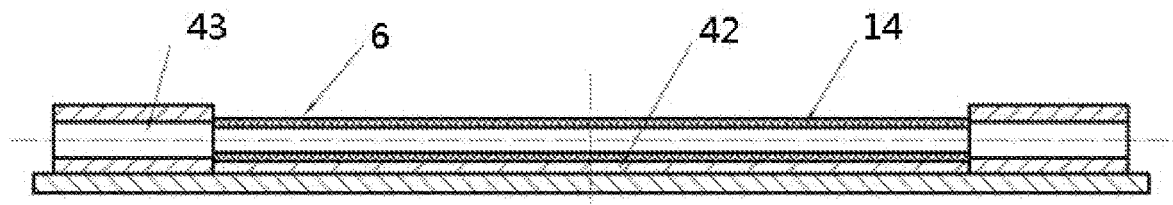
FIG. 21 is a partial sectional view of the manufacturing process tool for a lateral positioning strip toothed belt in Embodiment 12.

As shown in FIG. 21, a reduction belt thickness plate 42 is provided in the lateral positioning strip belt forming groove 6, the reduction belt thickness plate 42 and the fixing molded plate 2 are connected in a separated mode, a width of the reduction belt thickness plate 42 is equal to that of a belt face of the lateral positioning strip toothed belt 14, a diameter of the equidistant fixed lateral positioning strip hole 43 is smaller than a thickness of the lateral positioning strip toothed belt 14, or equal to the thickness of the lateral positioning strip toothed belt 14, or larger than the thickness of the lateral positioning strip toothed belt 14, a diameter of the extra-belt lateral positioning strip 10 is larger than or equal to the thickness of the lateral positioning strip toothed belt 14, and the extra-belt lateral positioning strip 10 does not deform when bearing super-large tension.

The remaining is the same as in Embodiment 1.

Embodiment 13

Figure 22:
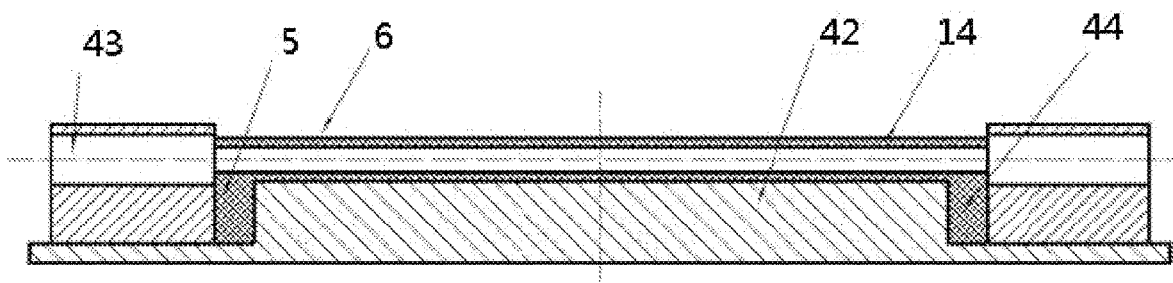
FIG. 22 is a partial sectional view of a manufacturing process tool for a lateral positioning strip toothed belt in Embodiment 13.

As shown in FIG. 22, a reduction belt thickness plate 42 is provided in the lateral positioning strip belt forming groove 6, the reduction belt thickness plate 42 and the fixing molded plate 2 are integrated, a width of the reduction belt thickness plate 42 is smaller than that of a belt face of the lateral positioning strip toothed belt 14, the rubber body 5 between the reduction belt thickness plate 42 and the lateral strip belt length positioner 4 forms a lateral positioning strip toothed belt flange 44, a diameter of the equidistant fixed lateral positioning strip hole 43 is smaller than a thickness of the lateral positioning strip toothed belt 14, or equal to the thickness of the lateral positioning strip toothed belt 14, or larger than the thickness of the lateral positioning strip toothed belt 14, a diameter of the extra-belt lateral positioning strip 10 is larger than or equal to the thickness of the lateral positioning strip toothed belt 14, and the extra-belt lateral positioning strip 10 does not deform when bearing super-large tension.

The remaining is the same as in Embodiment 1.

What is claimed is:

1. A manufacturing process method for a lateral positioning strip toothed belt, comprising:
   (1) providing an upper fixed lateral positioning strip device and a lower fixed lateral positioning strip device to form a lateral strip belt length positioner, the upper fixed lateral positioning strip device and the lower fixed lateral positioning strip device being connected in a separated manner or integrated;
   (2) providing a front lateral strip belt width positioner and/or a rear lateral strip belt width positioner to form a lateral strip belt width positioner;
   (3) providing a lateral strip fixing hole or a lateral strip fixing groove in the lateral strip belt length positioner;
   (4) providing a fixing molded plate, the fixing molded plate being configured to fix the lateral strip belt width positioner and/or the lateral strip belt length positioner;
   (5) providing an extra-belt lateral positioning strip and an intra-belt lateral positioning strip to form a lateral positioning strip;
   (6) providing the lateral strip belt length positioner on one side or two sides of the fixing molded plate, the lateral strip belt length positioner facing an inner side of the fixing molded plate to form a lateral positioning strip belt forming groove together with the lateral strip belt width positioner;
   (7) providing, when the upper fixed lateral positioning strip device and the lower fixed lateral positioning strip device separated from each other are used, fixed lateral positioning strip grooves in the upper fixed lateral positioning strip device and/or the lower fixed lateral positioning strip device, providing the extra-belt lateral positioning strip in the fixed lateral positioning strip groove, providing the intra-belt lateral positioning strip in the lateral positioning strip belt forming groove, buckling the upper fixed lateral positioning strip device and the lower fixed lateral positioning strip device, providing the front lateral strip belt width positioner and/or the rear lateral strip belt width positioner at an end of the fixing molded plate, so as to buckle the lateral strip belt width positioner, the lateral strip belt length positioner and the fixing molded plate to form the lateral positioning strip belt forming groove, providing the intra-belt lateral positioning strip in the lateral positioning strip belt forming groove, and providing a rubber body in the lateral positioning strip belt forming groove, the rubber body being wrapped around the intra-belt lateral positioning strip to form a lateral positioning strip toothed belt;
   (8) drawing the intra-belt lateral positioning strip out to form a perforated lateral positioning strip belt or integrating the intra-belt lateral positioning strip and the rubber body, the extra-belt lateral positioning strip forming a lateral positioning strip toothed belt on one side or two sides of the lateral positioning strip; and
   (9) combining, when the upper fixed lateral positioning strip device and the lower fixed lateral positioning strip device are integrated, the upper fixed lateral positioning strip device and the lower fixed lateral positioning strip device to form a hole type fixed lateral positioning strip device, providing a fixed extra-belt lateral strip hole in a side portion of the hole type fixed lateral positioning strip device, providing the extra-belt lateral positioning strip in the fixed extra-belt lateral strip hole, the hole type fixed lateral positioning strip device facing an inner side of the fixing molded plate to form a lateral positioning strip belt forming groove together with the lateral strip belt width positioner, providing the intra-belt lateral positioning strip in the lateral positioning strip belt forming groove, providing the rubber body in the lateral positioning strip belt forming groove, the rubber body being wrapped around the intra-belt lateral positioning strip to form the lateral positioning strip toothed belt, and drawing the intra-belt lateral positioning strip out to form the perforated lateral positioning strip belt or integrating the intra-belt lateral positioning strip and the rubber body.

2. A manufacturing process tool for a lateral positioning strip toothed belt, the manufacturing process tool for the lateral positioning strip toothed belt comprises a lateral positioning strip, a fixing molded plate, a lateral strip belt width positioner, a lateral strip belt length positioner and a rubber body, wherein the lateral strip belt length positioner and the fixing molded plate are connected in a separated mode or integrated, the lateral strip belt width positioner and the fixing molded plate are connected in a separated mode or integrated, the lateral strip belt length positioner comprises a left lateral strip belt length positioner and/or a right lateral strip belt length positioner, the fixing molded plate is configured to fix the lateral strip belt width positioner and/or the lateral strip belt length positioner, the lateral strip belt length positioner is provided on one side or two sides of the fixing molded plate, the lateral strip belt length positioner faces the inner side of the fixing molded plate to form the lateral positioning strip belt forming groove together with the lateral strip belt width positioner, and the lateral strip belt length positioner comprises an upper fixed lateral positioning strip device and a lower fixed lateral positioning strip device, the upper fixed lateral positioning strip device and the lower fixed lateral positioning strip device being connected in a separated mode or integrated; when the upper fixed lateral positioning strip device and the lower fixed lateral positioning strip device are connected in the separated mode, the upper fixed lateral positioning strip device and/or the lower fixed lateral positioning strip device is provided with the fixed lateral positioning strip groove, the lateral positioning strip comprises an extra-belt lateral positioning strip and an intra-belt lateral positioning strip, the extra-belt lateral positioning strip being provided in the fixed lateral positioning strip groove, and the intra-belt lateral positioning strip being provided in the lateral positioning strip belt forming groove, the upper fixed lateral positioning strip device and the lower fixed lateral positioning strip device are buckled, the lateral strip belt width positioner comprises a front lateral strip belt width positioner and/or a rear lateral strip belt width positioner, the front lateral strip belt width positioner and/or the rear lateral strip belt width positioner is provided at an end of the fixing molded plate, the lateral strip belt width positioner, the lateral strip belt length positioner and the fixing molded plate are buckled to form the lateral positioning strip belt forming groove, the intra-belt lateral positioning strip is provided in the lateral positioning strip belt forming groove, the rubber body is provided in the lateral positioning strip belt forming groove, the rubber body is wrapped around the intra-belt lateral positioning strip to form a lateral positioning strip toothed belt, the intra-belt lateral positioning strip is drawn out to form a perforated lateral positioning strip belt or the intra-belt lateral positioning strip and the rubber body are integrated, and the extra-belt lateral positioning strip forms a lateral positioning strip toothed belt on one side or two sides of the lateral positioning strip; when the upper fixed lateral positioning strip device and the lower fixed lateral positioning strip device are integrated, the upper fixed lateral positioning strip device and the lower fixed lateral positioning strip device are combined to form a hole type fixed lateral positioning strip device, a fixed extra-belt lateral strip hole is provided in a side portion of the hole type fixed lateral positioning strip device, the extra-belt lateral positioning strip is provided in the fixed extra-belt lateral strip hole, the hole type fixed lateral positioning strip device faces an inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body is wrapped around the intra-belt lateral positioning strip to form the lateral positioning strip toothed belt, and the intra-belt lateral positioning strip is drawn out to form the perforated lateral positioning strip belt or the intra-belt lateral positioning strip and the rubber body are integrated; when the upper fixed lateral positioning strip device and the lower fixed lateral positioning strip device integrated are used, a fixed extra-belt lateral positioning strip through hole is provided in the lateral strip belt length positioner or a fixed extra-belt lateral positioning strip groove is provided in the lateral strip belt length positioner so as to form a groove type fixed lateral positioning strip device, the extra-belt lateral positioning strip is provided in the fixed extra-belt lateral positioning strip groove, the groove type fixed lateral positioning strip device faces the inner side of the fixing molded plate to form a lateral positioning strip belt forming groove together with the lateral strip belt width positioner, the intra-belt lateral positioning strip is provided in the lateral positioning strip belt forming groove, the rubber body is provided in the lateral positioning strip belt forming groove, the rubber body is wrapped around the intra-belt lateral positioning strip to form the lateral positioning strip toothed belt, and the intra-belt lateral positioning strip is drawn out to form the perforated lateral positioning strip belt or the intra-belt lateral positioning strip and the rubber body are integrated; and when the upper fixed lateral positioning strip device and the lower fixed lateral positioning strip device separated from each other are used, the lower fixed lateral positioning strip device comprises a groove type lower fixed lateral positioning strip device, the groove type lower fixed lateral positioning strip device is provided on the fixing molded plate, the upper fixed lateral positioning strip device comprises an upper fixed lateral positioning strip block, the groove type lower fixed lateral positioning strip device is provided with a plurality of equidistant fixed lateral positioning strip grooves, the plurality of upper fixed lateral positioning strip blocks match the plurality of equidistant fixed lateral positioning strip grooves to form a plurality of equidistant fixed lateral positioning strip holes, the extra-belt lateral positioning strip is provided in the plurality of equidistant fixed lateral positioning strip holes, the intra-belt lateral positioning strip is provided in the lateral positioning strip belt forming groove, the front lateral strip belt width positioner and/or the rear lateral strip belt width positioner is provided at the end of the fixing molded plate, the rubber body is provided in the lateral positioning strip belt forming groove, and the rubber body is wrapped around the intra-belt lateral positioning strip to form the lateral positioning strip toothed belt.

3. The manufacturing process tool for the lateral positioning strip toothed belt according to claim 2, wherein the fixing molded plate comprises one or more of a molded plate positioning strip groove, a molded plate positioning strip hole, a molded plate positioning strip flange, and a molded plate positioning strip flat plate and a molded plate positioning strip clamping member, the molded plate positioning strip groove or the molded plate positioning strip hole or the molded plate positioning strip flange or the molded plate positioning strip flat plate or the molded plate positioning strip clamping member being configured to position the lateral strip belt length positioner.

4. The manufacturing process tool for the lateral positioning strip toothed belt according to claim 2, wherein the fixing molded plate comprises an upper fixing molded plate and a lower fixing molded plate, the lower fixing molded plate being configured to position the lateral strip belt length positioner and/or the lateral strip belt width positioner, the upper fixing molded plate being buckled to the lateral positioning strip belt forming groove, and the upper fixing molded plate and the lower fixing molded plate flattening an upper surface and a lower surface of the lateral positioning strip belt or being shaped to meet a production requirement of a conveyor belt.

5. The manufacturing process tool for the lateral positioning strip toothed belt according to claim 2, wherein the upper fixed lateral positioning strip device comprises a screw rod, a clamp, a buckling groove or a fixing pin, the upper fixed lateral positioning strip device and the lower fixed lateral positioning strip device are buckled by means of the screw rod or the clamp or the buckling groove or the fixing pin, when the screw rod is used for buckling, the upper fixed lateral positioning strip device is provided with an upper connection hole, the lower fixed lateral positioning strip device is provided with a lower connection screw hole, and the screw rod penetrates the upper connection hole and is screwed into the lower connection screw hole to fix the upper fixed lateral positioning strip device and the lower fixed lateral positioning strip device.

6. The manufacturing process tool for the lateral positioning strip toothed belt according to claim 2, wherein an upper positioning lateral strip semicircular hole is provided in the upper fixed lateral positioning strip device, a lower positioning lateral strip semicircular hole is provided in the lower fixed lateral positioning strip device, the extra-belt lateral positioning strip is provided in the lower positioning lateral strip semicircular hole, the upper positioning lateral strip semicircular hole and the lower positioning lateral strip semicircular hole are closed to position the extra-belt lateral positioning strip, and the rubber body is wrapped around the intra-belt lateral positioning strip to form the lateral positioning strip toothed belt.

7. The manufacturing process tool for the lateral positioning strip toothed belt according to claim 2, wherein the upper fixed lateral positioning strip device is positioned on the upper fixing molded plate, the lower fixed lateral positioning strip device is positioned on the lower fixing molded plate, the extra-belt lateral positioning strip is provided in the lateral strip fixing hole or the lateral strip fixing groove, and the rubber body is wrapped around the intra-belt lateral positioning strip to form the lateral positioning strip toothed belt.

8. The manufacturing process tool for the lateral positioning strip toothed belt according to claim 2, wherein the lateral strip belt length positioner comprises an accurate positioning lateral strip baffle hole and an accurate positioning lateral strip baffle, the accurate positioning lateral strip baffle hole being provided in an end, facing the inner side of the fixing molded plate, of the lateral strip fixing hole, the lateral strip belt length positioner is configured to position the accurate positioning lateral strip baffle to provide the accurate positioning lateral strip baffle on the lateral positioning strip in a penetrating mode, the extra-belt lateral positioning strip is placed into the fixed extra-belt lateral strip hole, the accurate positioning lateral strip baffle is pushed into the accurate positioning lateral strip baffle hole, the accurate positioning lateral strip baffle hole and the accurate positioning lateral strip baffle are configured to accurately position the lateral positioning strip, and the accurate positioning lateral strip baffle prevents the rubber body from entering the fixed extra-belt lateral strip hole.

9. The manufacturing process tool for the lateral positioning strip toothed belt according to claim 2, wherein the lateral positioning strip toothed belt comprises a planar lateral positioning strip toothed belt or a leakage-resistant flange face lateral positioning strip toothed belt or a material-sliding-resistant patterned face lateral positioning strip toothed belt, when the material-sliding-resistant patterned face lateral positioning strip toothed belt is manufactured, an upper fixing molded plate or a lower fixing molded plate is provided with a material-sliding-resistant molded patterned groove, the material-sliding-resistant molded patterned groove is provided in the lateral positioning strip belt forming groove, and the rubber body flows into the material-sliding-resistant molded patterned groove to form the material-sliding-resistant patterned face lateral positioning strip toothed belt.

10. The manufacturing process tool for the lateral positioning strip toothed belt according to claim 2, wherein the groove type fixed lateral positioning strip device comprises a left fixed lateral positioning groove and/or a right fixed lateral positioning groove, the extra-belt lateral positioning strips are provided in the left fixed lateral positioning groove and/or the right fixed lateral positioning groove, the left fixed lateral positioning groove is configured to fix a left side of the extra-belt lateral positioning strip, the right fixed lateral positioning groove is configured to fix a right side of the extra-belt lateral positioning strip, the groove type fixed lateral positioning strip device is provided with a groove fixing side strip mechanism fixed to the fixing molded plate each other, and
the groove fixing side strip mechanism comprises a thread type fixing mechanism, a pin type fixing mechanism, a fastener type fixing mechanism and a flange type fixing mechanism.

11. The manufacturing process tool for the lateral positioning strip toothed belt according to claim 2, wherein a reduction belt thickness plate is provided in the lateral positioning strip belt forming groove, the reduction belt thickness plate and the fixing molded plate are connected in a separated mode or integrated, a width of the reduction belt thickness plate is equal to that of a belt face of the lateral positioning strip toothed belt or smaller than that of the belt face of the lateral positioning strip toothed belt, when the width of the reduction belt thickness plate is smaller than that of the belt face of the lateral positioning strip toothed belt, the rubber body between the reduction belt thickness plate and the lateral strip belt length positioner forms a lateral positioning strip toothed belt flange, a diameter of the equidistant fixed lateral positioning strip hole is smaller than a thickness of the lateral positioning strip toothed belt, or equal to the thickness of the lateral positioning strip toothed belt, or larger than the thickness of the lateral positioning strip toothed belt, a diameter of the extra-belt lateral positioning strip is larger than or equal to the thickness of the lateral positioning strip toothed belt, and the extra-belt lateral positioning strip does not deform when bearing super-large tension.

12. The manufacturing process tool for the lateral positioning strip toothed belt according to claim 4, wherein an upper positioning lateral strip semicircular hole is provided in the upper fixed lateral positioning strip device, a lower positioning lateral strip semicircular hole is provided in the lower fixed lateral positioning strip device, the extra-belt lateral positioning strip is provided in the lower positioning lateral strip semicircular hole, the upper positioning lateral strip semicircular hole and the lower positioning lateral strip semicircular hole are closed to position the extra-belt lateral positioning strip, and the rubber body is wrapped around the intra-belt lateral positioning strip to form the lateral positioning strip toothed belt.

13. The manufacturing process tool for the lateral positioning strip toothed belt according to claim 4, wherein the upper fixed lateral positioning strip device is positioned on the upper fixing molded plate, the lower fixed lateral positioning strip device is positioned on the lower fixing molded plate, the extra-belt lateral positioning strip is provided in the lateral strip fixing hole or the lateral strip fixing groove, and the rubber body is wrapped around the intra-belt lateral positioning strip to form the lateral positioning strip toothed belt.

* * * * *